United States Patent
Ichikawa et al.

(10) Patent No.: US 6,919,974 B1
(45) Date of Patent: Jul. 19, 2005

(54) IMAGE READING DEVICE, IMAGE READING METHOD, AND LIGHT SOURCE FOR THE SAME

(75) Inventors: Hirokazu Ichikawa, Ebina (JP); Hidekazu Imai, Ebina (JP); Yoshiya Imoto, Ebina (JP); Michio Kikuchi, Ebina (JP)

(73) Assignee: Fuji Xerox Co., Ltd., Tokyo (JP)

( * ) Notice: Subject to any disclaimer, the term of this patent is extended or adjusted under 35 U.S.C. 154(b) by 0 days.

(21) Appl. No.: 09/444,869

(22) Filed: Nov. 22, 1999

(30) Foreign Application Priority Data

Dec. 1, 1998 (JP) .......................................... 10-342188

(51) Int. Cl.[7] .............................. H04N 1/04; H01J 61/06
(52) U.S. Cl. ...................... 358/475; 358/509; 358/474; 358/505; 313/607; 362/260; 362/263
(58) Field of Search ................................ 358/475, 509, 358/474, 505, 487, 506, 484; 362/260, 263, 257, 267; 313/607; 399/51, 4, 366; 250/205, 234–236, 208.1, 226; 382/312, 313, 318, 319; 318/201–203; 355/133

(56) References Cited

U.S. PATENT DOCUMENTS

| | | | | |
|---|---|---|---|---|
| 4,739,377 A | * | 4/1988 | Allen .......................... | 355/133 |
| 4,974,068 A | * | 11/1990 | Hiramatsu et al. .......... | 358/506 |
| 5,453,611 A | * | 9/1995 | Oozu et al. ............... | 250/208.1 |
| 5,514,934 A | * | 5/1996 | Matsumoto et al. ........ | 313/607 |
| 5,801,373 A | * | 9/1998 | Oozu et al. ............... | 250/208.1 |
| 6,039,257 A | * | 3/2000 | Berson et al. ............... | 235/468 |
| 6,051,826 A | * | 4/2000 | Arimoto et al. .......... | 250/208.1 |
| 6,233,065 B1 | * | 5/2001 | Lee ............................. | 358/475 |

FOREIGN PATENT DOCUMENTS

| JP | Hei. 6-141145 | | 5/1994 |
|---|---|---|---|
| JP | 07-272672 | * | 10/1995 |
| JP | 407272672 A | * | 10/1995 |

* cited by examiner

*Primary Examiner*—Cheukfan Lee
(74) *Attorney, Agent, or Firm*—Morgan Lewis & Bockius LLP

(57) ABSTRACT

The image reading device of the present invention reads images by using a visible light and an invisible light that are generated by a single light source. The fluorescent lamp is provided with a pair of internal electrodes and a pair of external electrodes. It generates a visible light with a higher intensity than an infrared light when switching a feeder circuit on to generate a discharge between the external electrodes. On the other hand, it generates an infrared light with a higher intensity than a visible light when switching another feeder circuit on to generate a discharge between the internal electrodes. Therefore, the fluorescent lamp has a reading mode using the visible light, and a reading mode using the infrared light. And, a lamp controller selectively switches the emission mode of the fluorescent lamp.

14 Claims, 16 Drawing Sheets

RELATIVE SPECTRAL ENERGY DISTRIBUTION OF A RED LUMINOUS PHOSPHOR

RELATIVE SPECTRAL ENERGY DISTRIBUTION OF A PHOSPHOR WITH BLUE, GREEN, RED LUMINOUS PHOSPHORS BLENDED

EXTERNAL ELECTRODE

RELATIVE SPECTRAL ENERGY DISTRIBUTION OF THE FLUORESCENT LAMP 20 IN THE FIRST EMISSION MODE

INTERNAL ELECTRODE

RELATIVE SPECTRAL ENERGY DISTRIBUTION OF THE FLUORESCENT LAMP 20 IN THE SECOND EMISSION MODE

LOW CURRENT ## FIG. 11
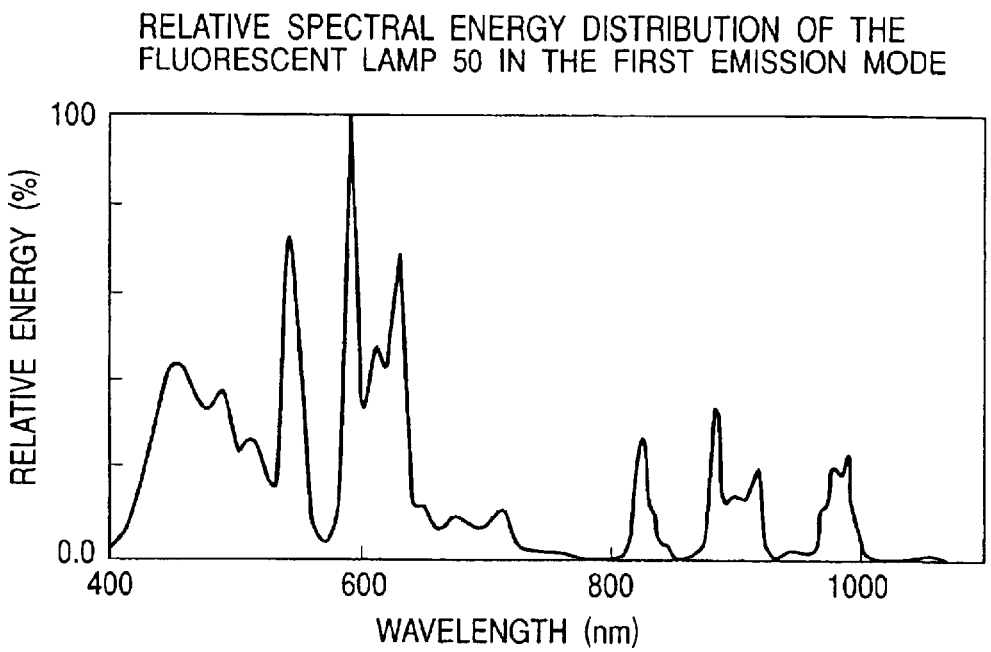
RELATIVE SPECTRAL ENERGY DISTRIBUTION OF THE
FLUORESCENT LAMP 50 IN THE FIRST EMISSION MODE
HIGH CURRENT ## FIG. 12
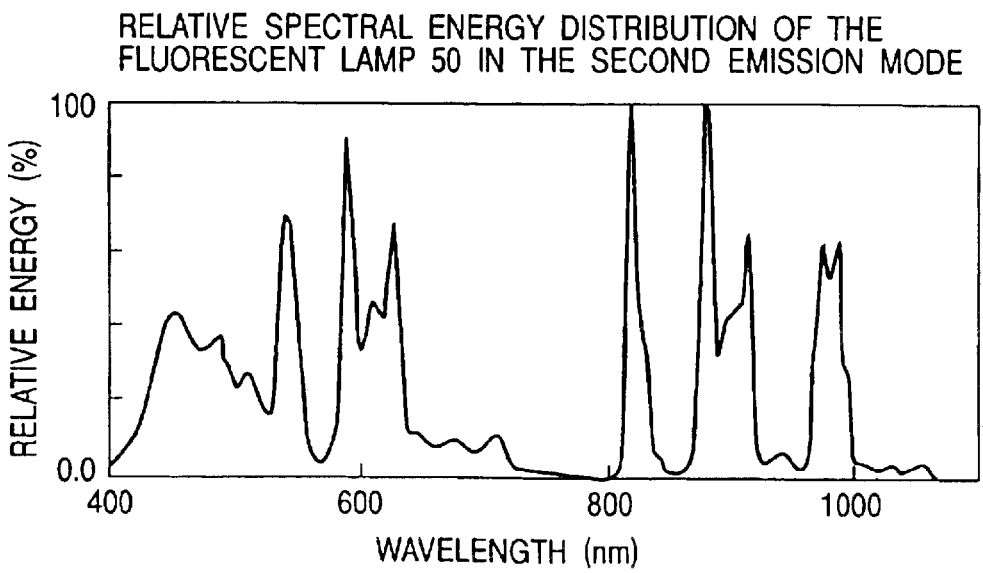
RELATIVE SPECTRAL ENERGY DISTRIBUTION OF THE
FLUORESCENT LAMP 50 IN THE SECOND EMISSION MODE

SPECTRAL REFLECTANCE OF AN INFRARED ABSORBING TONER

IMAGE READING DEVICE, IMAGE READING METHOD, AND LIGHT SOURCE FOR THE SAME

BACKGROUND OF THE INVENTION

1. Field of the Invention

The present invention relates to an image reading device and an image reading method that are used in reading visible images and invisible images, and a light source for the same.

2. Description of the Related Art

A printing technique using an ink or toner that transmits visible lights and absorbs invisible lights is becoming popular. Invisible images acquired by such a technique can be read by the analysis of the invisible lights reflected therefrom. Even a regular image reading device is desired to adopt the reading function for such invisible lights. Accordingly, various techniques regarding a single device that can read both the visible images and the invisible images have already been put forward.

There is, for example, a technique proposed such that a visible light source and an infrared light source are individually provided in a single device. Such a technique, however, necessarily involves the size expansion of the device. Further, if multiple light sources are used, there are inevitable differences in positions in which the light sources each emit, which creates shades on the copy, so that precise reading will become difficult.

On the other hand, in the technique disclosed in the Japanese Published Unexamined Patent Application No. Hei 6-141145, a halogen lamp having a wide wavelength band of emission which emits a visible light and an infrared light is employed, either a visible light cutoff filter or an infrared cutoff filter is selectively positioned in the path of a reflected light from the copy image, whereby both the visible images and the invisible images can be read. This technique, however, requires a halogen lamp with great power consumption, which emits a light of a wide wavelength band.

In recent years, for the purpose of reducing the power consumption and enhancing the reliability, as a light source for the general image reading device that reads the visible images, a fluorescent lamp (specially, a rare gas fluorescent lamp having high stability of luminous energy) is increasing in use, instead of the halogen lamp. It is convenient to use a fluorescent lamp as a light source to read not only the visible images but also the invisible images. However, a fluorescent lamp scarcely emits an invisible light such as an infrared light under the condition of emitting a visible light efficiently.

SUMMARY OF THE INVENTION

The present invention provides an image reading device and an image reading method to read images by using the visible light and invisible light generated by a single light source, and a light source that can be used for the same.

The image reading device irradiates an object with a light and reads a reflected light, which includes a single light source capable of irradiating a visible light and an invisible light, a reading unit that reads the reflected light from the object irradiated with the light from the light source, and a controller that selectively switches an emission mode of the light source. The emission mode of the light source in this reading device includes a first mode for reading that uses the visible light and a second mode for reading that uses the invisible light, for example, an infrared light. That is, in spite of being a single light source, this light source emits in the emission mode with less invisible light components and the other emission mode with more invisible light components. Therefore, the reading of a visible image and the reading of an invisible image can be implemented by switching the modes selectively.

The image reading method includes the step of switching an emission mode of a single light source capable of irradiating a visible light and an invisible light in accordance with a reading mode selected from a visible image reading mode and an invisible image reading mode, and the step of reading the reflected light from the object irradiated with the light from the light source while bringing the light source into emission in accordance with the emission mode switched.

Further, as another aspect, the image reading device may be provided with a single light source capable of irradiating a visible light and an invisible light, being a fluorescent lamp having a sealed container inside which a phosphor brought into emission by a discharge is disposed, a pair of internal electrodes disposed inside the sealed container, and a pair of external electrodes disposed outside thereof. The device may also includes a reading unit that reads the reflected light from the object irradiated with the light from the light source and a feeder circuit or feeding unit that supplies the fluorescent lamp with power so as to generate a discharge between the external electrodes synchronously with a discharge between the internal electrodes.

In the light source of this image reading device, a wavelength distribution of lights generated by a discharge between the internal electrodes differs from a wavelength distribution of lights generated by a discharge between the external electrodes. The feeder circuit makes it possible to acquire a broad wavelength band of emission, including the visible light band and the invisible light band, by executing these two discharge processes at the same time.

The light source according to the present invention which can be used in any of the foregoing image reading devices has a sealed container, a pair of internal electrodes disposed inside the sealed container, and a pair of external electrodes disposed outside the sealed container.

BRIEF DESCRIPTION OF THE DRAWINGS

Preferred embodiments of an image reading device, an image reading method and a light source according to the present invention will be described in detail based on the drawings:

FIG. 11 is a graph to illustrate a relative spectral energy distribution when a low current is applied (the first emission mode), in the fluorescent lamp shown in FIG. 9;

FIG. 12 is a graph to illustrate a relative spectral energy distribution when a high current is applied (the second emission mode), in the fluorescent lamp shown in FIG. 9;

DETAILED DESCRIPTION OF THE PREFERRED EMBODIMENTS

First Embodiment

A Light Source Having Two Pairs of Electrodes

Figure 1:
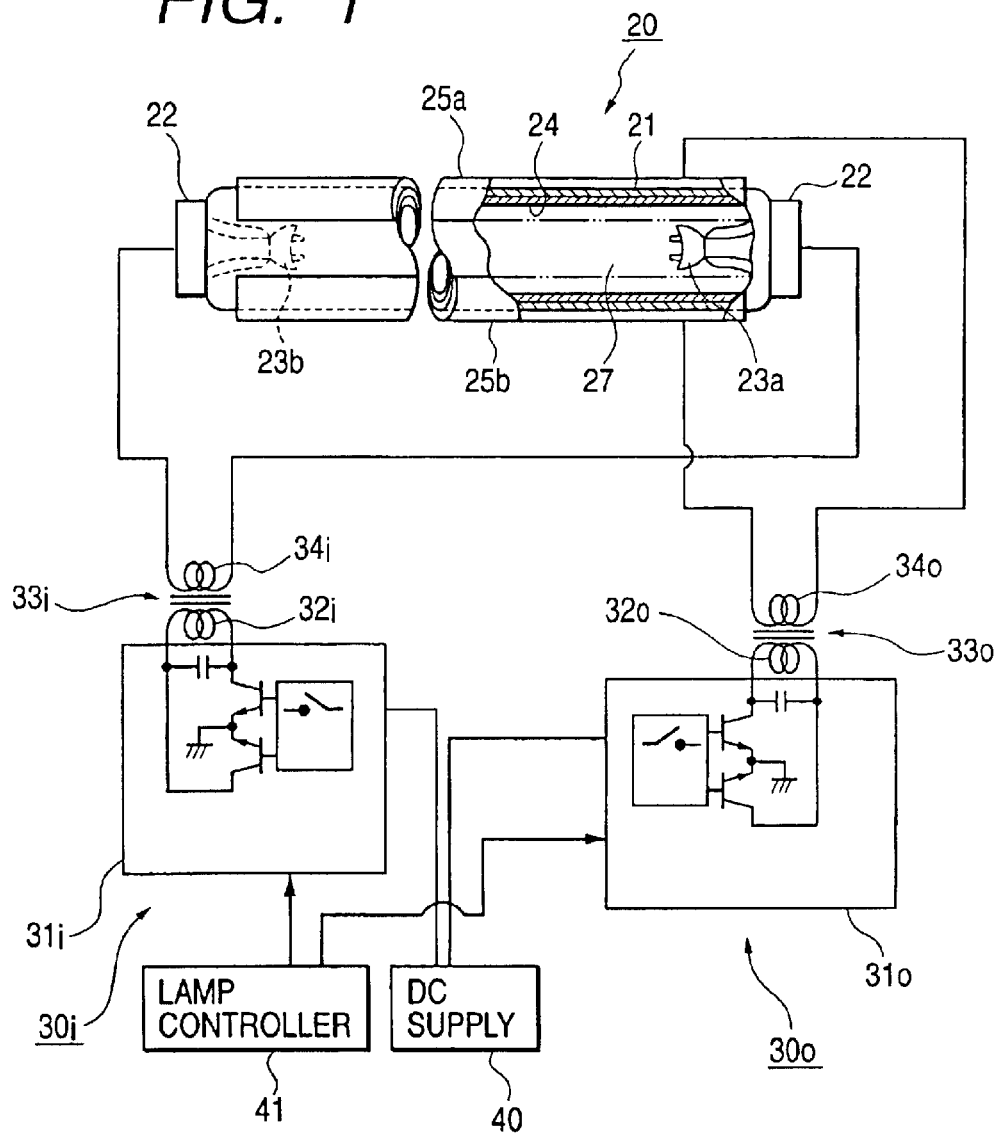
FIG. 1 is a block diagram to illustrate a fluorescent lamp having two pairs of electrodes as a light source according to the present invention, and an affiliated circuit thereto.
Figure 2:
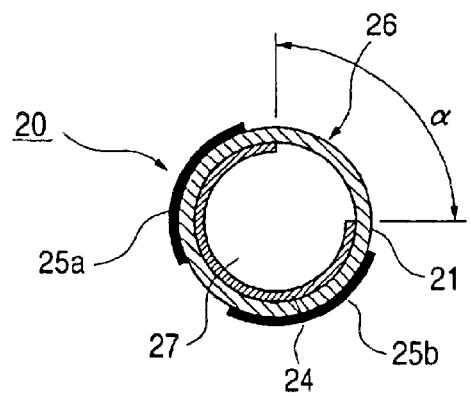
FIG. 2 is a sectional view of the above fluorescent lamp.
Figure 3:
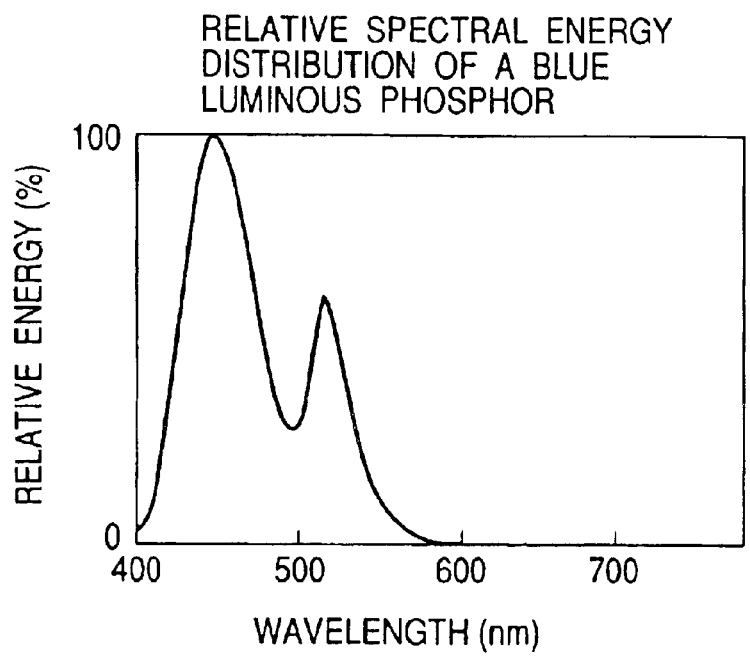
FIG. 3 is a graph to illustrate a relative spectral energy distribution of a blue luminous phosphor contained in the phosphor of the fluorescent lamp.
Figure 4:
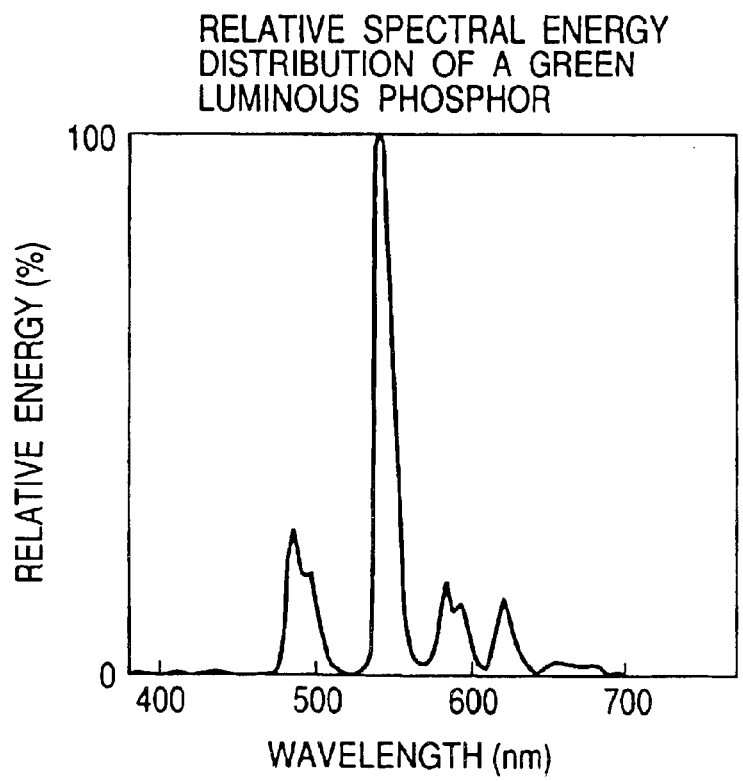
FIG. 4 is a graph to illustrate a relative spectral energy distribution of a green luminous phosphor contained in the phosphor of the fluorescent lamp.
Figure 5:
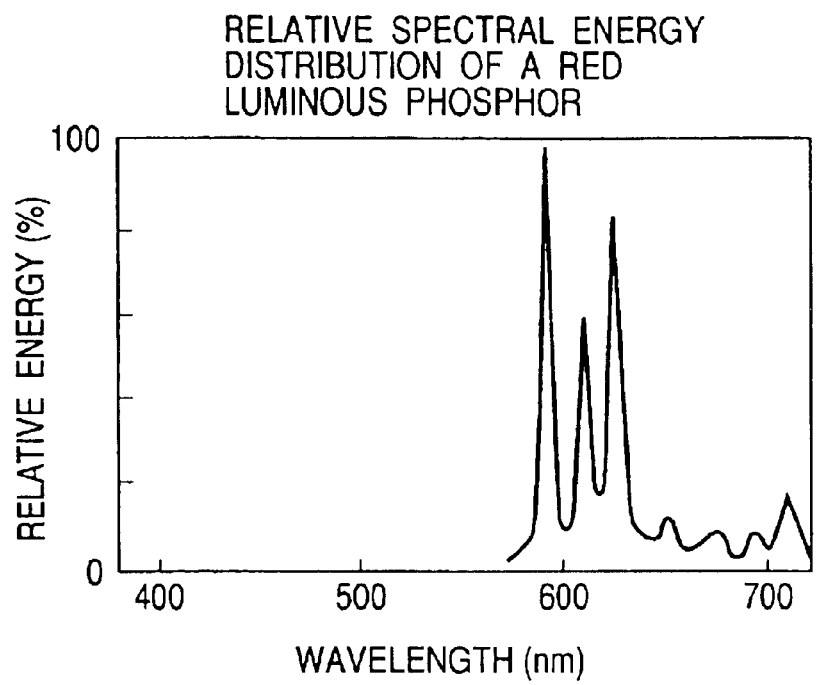
FIG. 5 is a graph to illustrate a relative spectral energy distribution of a red luminous phosphor contained in the phosphor of the fluorescent lamp.

First, a light source being a fluorescent lamp having two pairs of electrodes will be discussed which can be used for an image reading device according to the present invention. As shown in FIG. 1 and FIG. 2, a fluorescent lamp 20 contains a tube 21 made of a transparent body that can transmit not only visible lights but also infrared lights, concretely glass or quartz, a pair of caps 22 that each seal both the ends of the tube 21 hermetically, a pair of internal electrodes 23a, 23b attached to each of the caps 22, which are installed inside the tube 21. The internal electrodes 23a, 23b may be either of the hot electrodes and the cold electrodes that have usually been used. The internal electrodes in the drawing are the hot electrodes, but in the measurement described later, the cold electrodes were used. A gas 27 containing a rare gas, preferably, a xenon gas as a principal component is sealed inside the tube 21.

On the inner face of the tube 21, a phosphor 24 is disposed in a single layer. The phosphor 24 is coated to have a uniform depth. However, in order to increase the luminous energy to be transmitted through the tube 21, there is a part of the inner face of the tube 21 in which the phosphor 24 is not coated within a certain angle range α. This part extends in a belt along the axial direction of the tube 21. A reflection film may be provided between the tube 21 and the phosphor 24 except the angle range α.

And, on the outer face of the tube 21, a pair of external electrodes 25a, 25b are located. The external electrodes 25a, 25b are fastened to the tube 21, for example, by the evaporation of a conductive metal or by the adhesion of a metal foil. The external electrodes 25a, 25b are located at separate positions to each other, each of which extends along the axial direction of the tube 21. The external electrodes 25a, 25b are not disposed within the angle range α. Accordingly, the light by the fluorescent lamp 20 is radiated from a zonal opening 26.

Under this construction, applying a voltage across the internal electrodes 23a, 23b will generate a discharge between them. And, applying a voltage across the external electrodes 25a, 25b will generate a discharge between them. As will be described later, the discharge between the internal electrodes differs in the mode from that between the external electrodes.

Figure 6:
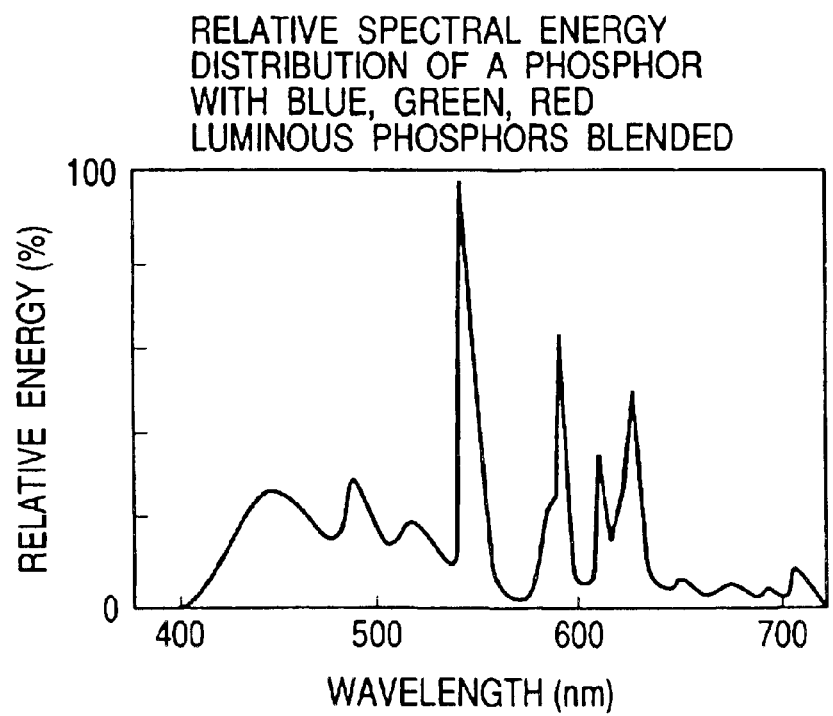
FIG. 6 is a graph to illustrate a relative spectral energy distribution of a phosphor in which the luminous phosphors of the fluorescent lamp illustrated in FIG. 3 through FIG. 5 are blended.

The discharge will excite the gas 27 inside the tube 21 to emit lights, which stimulate the phosphor 24. Thereby, the phosphor 24 emits lights according to the components of its own. The phosphor 24 contains the phosphors blended with a specific rate, which radiate the blue (B), green (G), and red (R) lights, which are excited by the resonance line of the wavelength 147 nm or by the resonance lines of the wavelengths 147 nm and 172 nm of the lights that the xenon atom contained in the gas 27 emits. The spectral distributions of emission energy of the B, G, R phosphors is illustrated, respectively, in FIG. 3 through FIG. 5. The spectral distribution of emission energy of the phosphor 24 with these phosphors blended is illustrated in FIG. 6. In FIG. 3 through FIG. 6, the spectral energy is normalized by regarding the peak emission energy in each spectral distribution as 100%. In the measurement relating to FIG. 3 through FIG. 6, a voltage was applied across the external electrodes 25a, 25b, and a discharge was generated between them. However, the light source according to the present invention is not limited to one having the phosphor 24 whose spectral distributions of emission energy are shown in these drawings; and the components of the phosphor 24 may be varied appropriately in conformity to the applications of the image reading device.

Back to FIG. 1, the internal electrodes 23a, 23b are fed by a feeder circuit $30_i$, and the external electrodes 25a, 25b are fed by a feeder circuit $30_o$. The feeder circuits 30 each contain inverter circuits 31 that convert a direct current from a direct current supply 40 into alternate currents to flow the alternate currents into primary coils 32, and transformers 33 that boost the alternate currents to relay to secondary coils 34. The inverter circuit 31 has a switch, transistors, and capacitors, etc. In the drawing, the suffix i attached to the symbols indicates that the symbols are for the internal electrodes, and the suffix o indicates that they are for the external electrodes.

To each of the inverter circuits 31, a lighting instruction signal is supplied from a lamp controller 41. The lighting instruction signal switches the internal switch into ON in the inverter circuit 31, so that the direct current from the direct current supply 40 is inverted into the alternate current. As the inverter circuit $31_i$ is switched on, a discharge between the internal electrodes 23a, 23b is generated accordingly, and the fluorescent lamp 20 emits lights. On the other hand, as the inverter circuit $31_o$ is switched on, a discharge between the external electrodes 25a, 25b is generated, and the fluorescent lamp 20 emits lights. When the lamp controller 41 does not supply the lighting instruction signal to either of the inverter circuits 31, the current is not fed to either of the electrode pairs, and the fluorescent lamp 20 does not emit lights. It is possible to vary the pulse number and the voltage in the inverter circuits $31_i$ and $31_o$.

Figure 7:
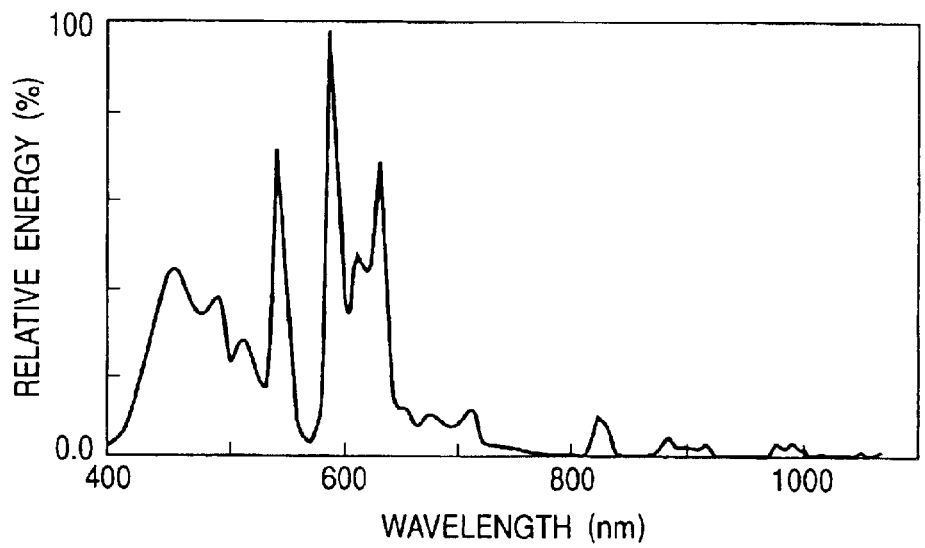
FIG. 7 is a graph to illustrate a relative spectral energy distribution when a discharge is generated between the external electrodes (the first emission mode), in the fluorescent lamp.
Figure 8:
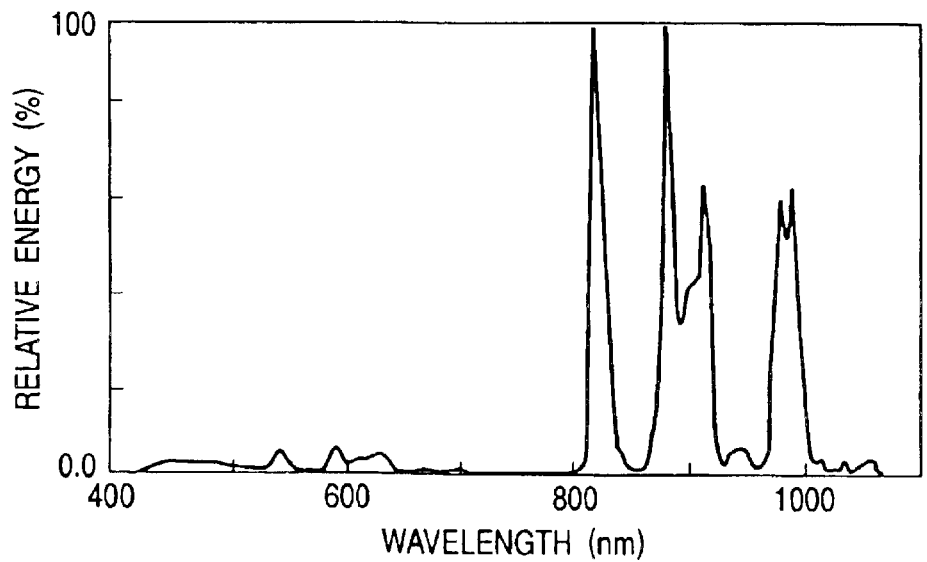
FIG. 8 is a graph to illustrate a relative spectral energy distribution when a discharge is generated between the internal electrodes (the second emission mode) by applying a high current across them, in the fluorescent lamp.

FIG. 7 illustrates a relative spectral energy distribution when a discharge is created between the external electrodes 25a, 25b (the first emission mode), in the fluorescent lamp 20 thus constructed. On the other hand, FIG. 8 illustrates a relative spectral energy distribution when a discharge is generated between the internal electrodes 23a, 23b (the second emission mode) by applying a current across them. In FIG. 7 and FIG. 8, the spectral energy is normalized by regarding the peak emission energy in each spectral distribution as 100%. As clear in FIG. 7 and FIG. 8, the first emission mode shows strong visible lights and weak infrared lights. On the other hand, the second emission mode shows weak visible lights and strong infrared lights. The reason of this phenomenon will be discussed.

In the discharge between the external electrodes 25a, 25b in the first emission mode, the tube 21 intervenes in the discharge path. Since the tube 21 is formed of a dielectric substance such as a glass, the discharge will not concentrate in a specific place. Therefore, impulse discharges continuing for extremely short times occur at any places. As a result, an ultraviolet light having high energy becomes the principal of the components of a light radiated from the xenon atom in the gas 27, which facilitates to excite the phosphor 24 and emit lights. This will make the visible lights strong and the infrared lights weak, speculate the inventors.

On the other hand, in the discharge between the internal electrodes 23a, 23b in the second emission mode, the tube 21 of a dielectric substance does not intervene in the discharge path, positive columns continuously appear so as to tie both the electrodes. As a result, the rate of an infrared light having a low energy of the components of a light radiated from the xenon atom in the gas 27 is raised, which makes it difficult to excite the phosphor 24. This will make the visible lights weak and the infrared lights strong, speculate the inventors. In the second emission mode, the infrared lights had multiple peaks of emission, and these peaks of emission appeared within a range covering 800 to 1000 nm.

As clear from the above explanation, it is possible to switch the emission mode of the fluorescent lamp 20 by selecting either the feeding to the internal electrodes or the feeding to the external electrodes. As will be described later, in the image reading device to which this fluorescent lamp 20 is applied, the reading that uses the visible lights is possible in the first emission mode, and the reading that uses the invisible lights is possible in the second emission mode.

Further, it is conceivable that the infrared lights and the visible lights can be emitted with an equal intensity by executing the discharge between the internal electrodes and the discharge between the external electrodes at the same time. Therefore, in the image reading device to which this fluorescent lamp 20 is applied, it is conceivable that the reading using the visible lights and the reading using the invisible lights can be achieved by executing both of the discharges at the same time, and switching the infrared cutoff filter and the visible light cutoff filter.

Second Embodiment

A Light Source Having a Pair of Electrodes

Figure 9:
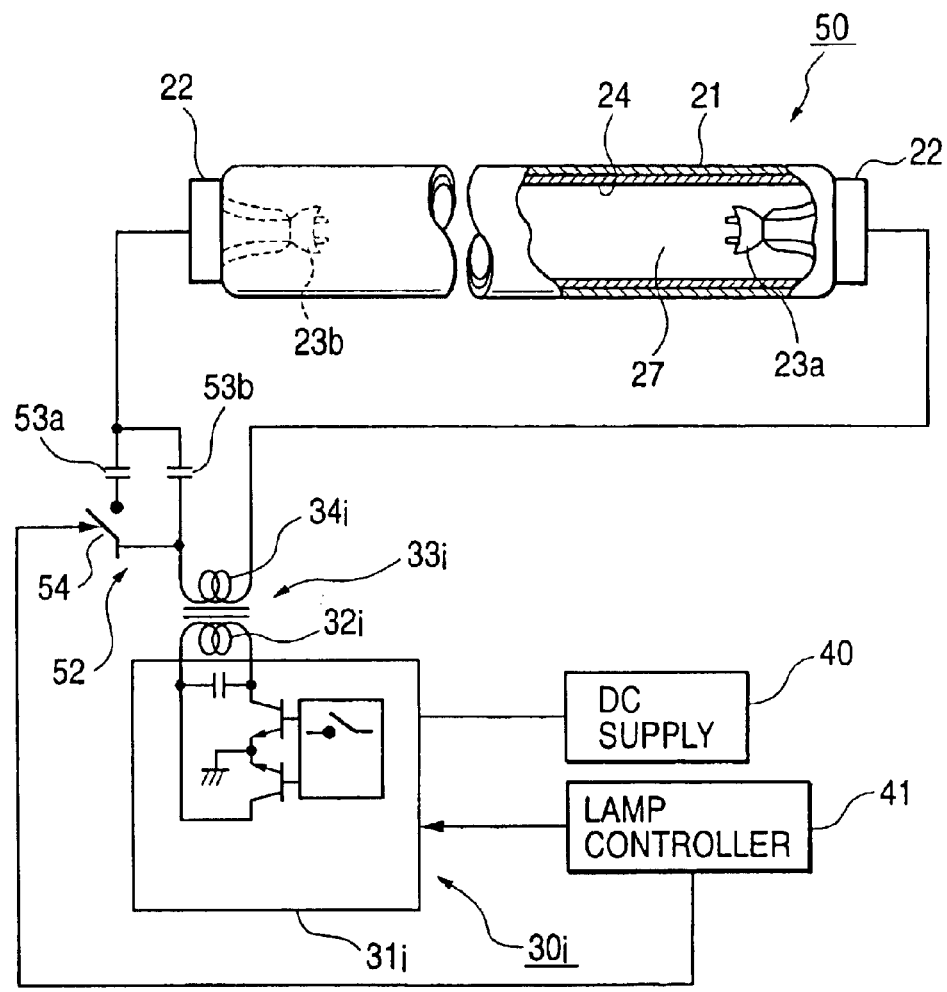
FIG. 9 is a block diagram to illustrate a fluorescent lamp having a pair of electrodes as a light source according to the present invention, and an affiliated circuit thereto.
Figure 10:
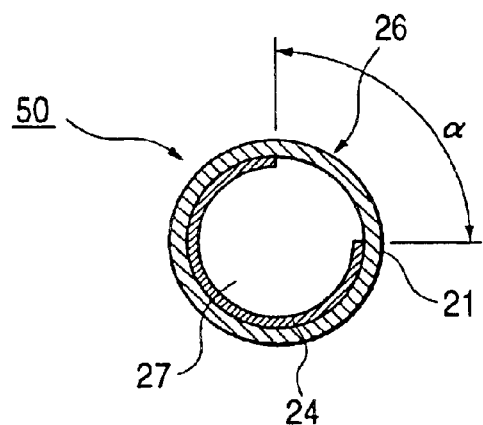
FIG. 10 is a sectional view of the fluorescent lamp shown in FIG. 9.

Next, a light source being a fluorescent lamp having a pair of electrodes will be discussed which can be used for an image reading device according to the present invention. As shown in FIG. 9 and FIG. 10, a fluorescent lamp 50 possesses the same construction as that of the fluorescent lamp 20 except the former does not have external electrodes 25a, 25b. Accordingly, the common components are given the same symbols to simplify the description. The gas 27 and the phosphor 24 used in the fluorescent lamp 50 are the same as those in the fluorescent lamp 20. The internal electrodes 23a, 23b may be either of the hot electrodes and the cold electrodes that have usually been used. The internal electrodes in the drawing are the hot electrodes, but in the measurement to be described later, the cold electrodes were used.

A feeder circuit $30_i$ feeds the power to the internal electrodes 23a, 23b. The feeder circuit $30_i$ has the common components as one of the feeder circuit 30 shown in FIG. 1. The common components are given the same symbols to omit the explanation. However, an impedance variable circuit 52 intervenes between the internal electrode 23b and one terminal of the secondary coil $34_i$ of the transformer $33_i$. The impedance variable circuit 52 includes capacitors 53a, 53b connected in parallel and a switch 54 connected in series to the capacitor 53a.

The switch 54 is switched ON/OFF in accordance with the instruction from the lamp controller 41. When the switch 54 is switched on during the inverter circuit $31_i$ being on, the impedance is lowered by the two capacitors 53a, 53b; thereby, the current running through the internal electrodes 23a, 23b becomes bigger. On the other hand, when the switch 54 is switched off during the inverter circuit $31_i$ being on, the capacitor 53a is not fed, the impedance in the impedance variable circuit 52 is raised; thereby, the current running through the internal electrodes 23a, 23b becomes smaller.

FIG. 11 illustrates a relative spectral energy distribution when the switch 54 is switched off to give a smaller current across the internal electrodes 23a, 23b (the first emission mode), in the fluorescent lamp 50 thus constructed. On the other hand, FIG. 12 illustrates a relative spectral energy distribution when the switch 54 is switched on to give a bigger current across the internal electrodes 23a, 23b (the second emission mode). In FIG. 11 and FIG. 12, the spectral energy is normalized by regarding the peak emission energy in each spectral distribution as 100%. As clear in FIG. 11 and FIG. 12, the first emission mode shows strong visible lights and weak infrared lights. On the other hand, the second emission mode shows weak visible lights and strong infrared lights. The reason of this phenomenon will be discussed.

As a bigger current is flown through the internal electrodes 23a, 23b than that in the first emission mode, the infrared light radiated from the xenon atom is raised, but of the energy radiated from the xenon atom, the wavelength band energy that excites the phosphor 24 is not substantially raised. Therefore, the visible lights are weak and the infrared lights are strong in the second emission mode, speculate the inventors.

On the other hand, as a smaller current is flown through the internal electrodes 23a, 23b than that in the second emission mode, the infrared light radiated from the xenon atom is lowered, but of the energy radiated from the xenon atom, the wavelength band energy that excites the phosphor 24 is not substantially varied. Therefore, the visible lights are strong and the infrared lights are weak in the first emission mode, speculate the inventors.

Thus, it is possible to switch the emission mode by the adjustment of the current given to the fluorescent lamp 50. And, as will be described later, in the image reading device to which this fluorescent lamp 50 is applied, the reading that uses the visible lights is possible in the first emission mode, and the reading that uses the invisible lights is possible in the second emission mode.

Third Embodiment

An Image Reading Device and an Image Reading Method

Figure 13:
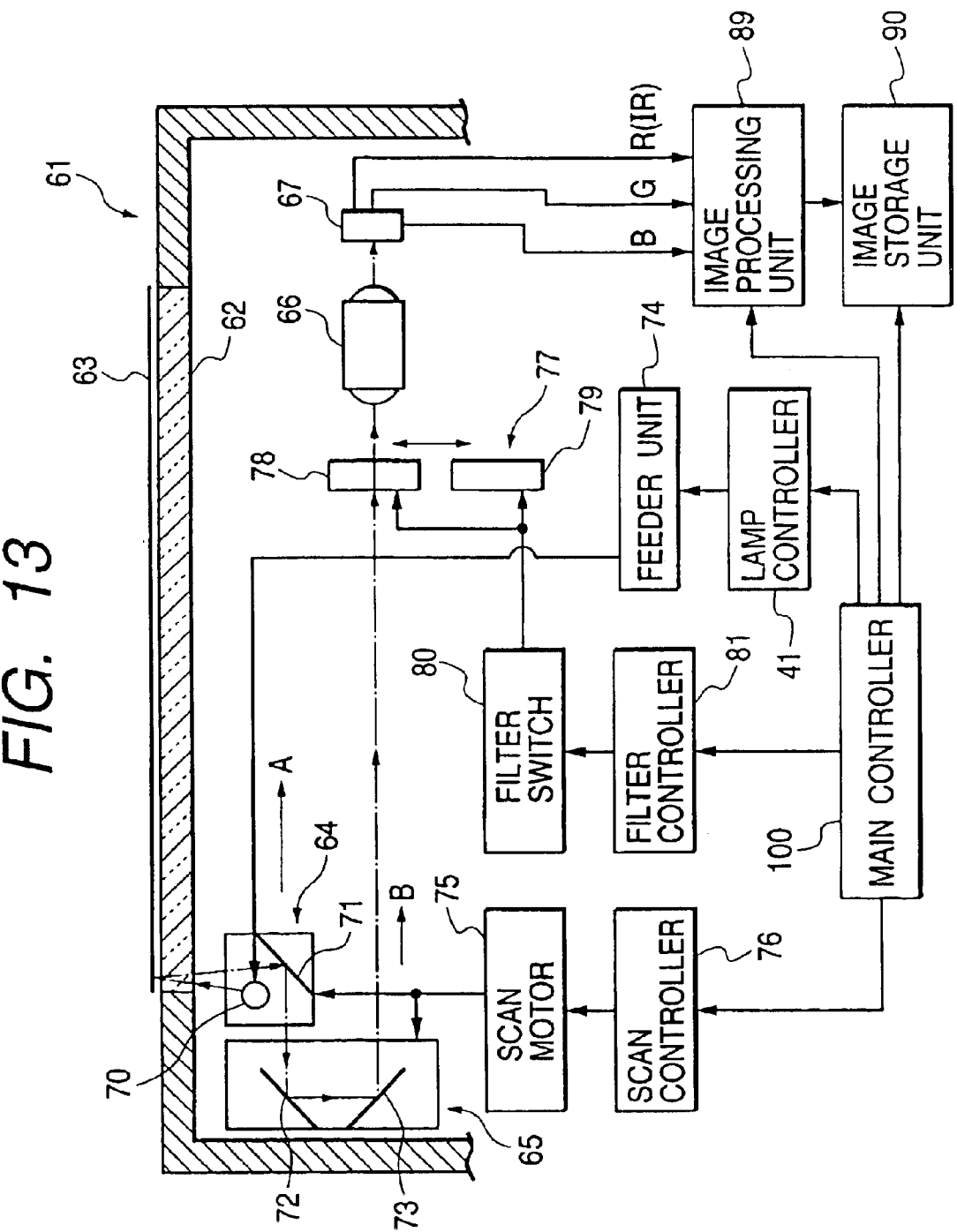
FIG. 13 is a schematic block diagram to illustrate an image reading device that adopts any of the above fluorescent lamps.

Next, the configuration of an image reading device using the fluorescent lamp 20 or the fluorescent lamp 50 will be described. This image reading device may be a stand-alone image scanner, or part of a copy machine. As shown in FIG. 13, the image reading device is provided with a cabinet 61, and a platen glass 62 is attached to an opening formed on the upper part of the cabinet 61. A copy sheet 63 is mounted on the platen glass 62. The image on the lower side of the copy sheet 63 can be read by this image reading device. It is presumed that the invisible images that have been formed from infrared absorbing toner or infrared absorbing ink, and/or the visible images that have been formed from ordinary toner or ink capable of absorbing the visible lights are present on the lower side of the copy sheet 63.

The cabinet 61 contains a full rate carriage 64, a half rate carriage 65, a lens-barrel 66, and a line image sensor 67. The carriages 64. 65, lens-barrel 66, and line image sensor 67 are arranged under the platen glass 62. The carriage 64 incorporates a lamp 70 and a first mirror 71. Reflectors and other parts can also be incorporated into the carriage 64. On the other hand, the carriage 65 incorporates a second mirror 72 and a third mirror 73.

The lamp 70 maybe the fluorescent lamp 20 having two pairs of the electrodes, or the fluorescent lamp 50 having a pair of the electrodes. The lamp 70 is brought into emission in order to read the stationary copy sheet 63 on the platen glass 62. The lamp 70 is fed by a feeder unit 74 that is controlled by the lamp controller 41. In the first reading mode using the visible lights, the lamp 70 emits a light that contains more of the visible lights radiated under the first emission mode and contains less of the infrared lights; on the other hand, in the second reading mode using the infrared lights, the lamp 70 emits a light that contains more of the infrared lights radiated under the second emission mode and contains less of the visible lights (see FIG. 7, FIG. 8, FIG. 11, FIG. 12). If the lamp 70 is the fluorescent lamp 20 having two pairs of the electrodes, the feeder unit 74 contains the feeder circuits $30_i$, $30_o$ shown in FIG. 1. If the lamp 70 is the fluorescent lamp 50 having a pair of the electrodes, the feeder unit 74 contains the feeder circuits $30_i$ and the impedance variable circuit 52 shown in FIG. 9.

An irradiation light from the lamp 70 transmits through the platen glass 62, reflects on the lower face of the copy sheet 63. Part of the reflected light transmits through the platen glass 62, reflects on the mirrors 71, 72, 73, converges in the lens-barrel 66, and forms an image on the line image sensor 67.

The lens-barrel 66 and the line image sensor 67 are fixed at specific positions. In contrast to this, the carriages 64, 65 are put into lateral movement as shown by the arrows A, B to scan the whole face of the copy sheet 63 on the platen glass 62. That is, the carriages 64, 65 move from the initial position shown in FIG. 13 to the end position shown in FIG. 14 so as to scan the copy sheet 63 from one end thereof to the other end thereof. Thereby, the line image sensor 67 reads the image on the copy sheet 63, and generates read image data corresponding to the image. Further, as shown by the arrows A', B' in FIG. 14, the carriages 64, 65 return to the initial position shown in FIG. 13 from the end position shown in FIG. 14.

The moving speed of the half rate carriage 65 is half of the moving speed of the full rate carriage 64. While the carriages 64, 65 are moving, the length of the optical path (shown by the dashed line) from the copy sheet 63 to the image sensor 67 via the mirrors 71, 72, 73 and the lens-barrel 66 is maintained constant. The carriages 64, 65 are driven to move by a scan motor 75 being the same drive source through a well-known pulley wire mechanism (not illustrated). The scan motor 75 is driven under the control of a scan controller 76. That is, the moving direction and the moving range of the carriages 64, 65 are instructed by the scan controller 76.

A filter unit 77 lies between the lens-barrel 66 and the third mirror 73 on the optical path, as illustrated. The filter unit includes an infrared cutoff filter 78, a visible light cutoff filter 79, and a filter switch 80 that switches these filters 78, 79. The filters 78, 79 are selected from various types, such as an interference filter or a colored glass. Under the control by the filter controller 81, the filter switch 80 is driven to put the infrared cutoff filter 78 in the optical path in the first reading mode using the visible lights, and to put the visible light cutoff filter 79 in the optical path in the second reading mode using the infrared lights.

Figure 15:
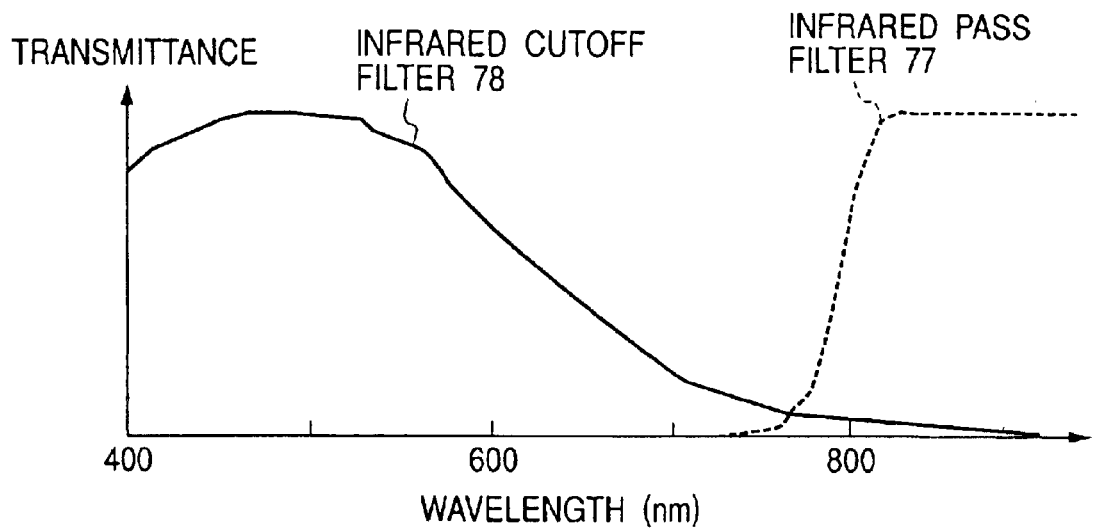
FIG. 15 is a graph to illustrate a spectral transmittance distribution of the infrared cut-off filter and the visible light cut-off filter of the above image reading device.

FIG. 15 illustrates a spectral transmittance distribution of the filters 78, 79. As shown in FIG. 15, the infrared cutoff filter 78 transmits much of the visible lights of a wavelength shorter than 700 nm; on the other hand, it does not virtually transmits the infrared lights of a wavelength longer than 700 nm. The visible light cutoff filter 79 transmits much of the infrared lights, but it does not virtually transmits the visible lights. Therefore, the visible lights fall on the line image sensor 67 in the first reading mode, and the infrared lights fall on the line image sensor 67 in the second reading mode.

Figure 16:
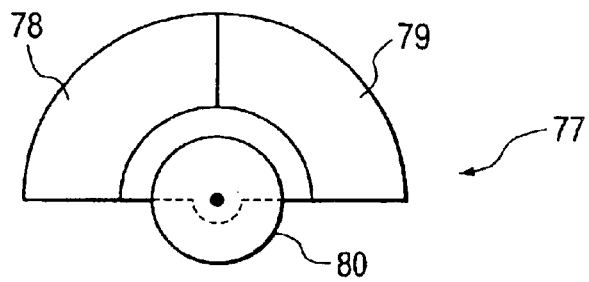
FIG. 16 is a side view to illustrate an example of a detailed construction of a filter unit of the image reading device.

FIG. 16 illustrates an example of a detailed construction of the filter unit 77. In FIG. 16, the infrared cutoff filter 78 and the visible light cutoff filter 79 resembling an arc plate are disposed on one plane and coupled with each other. The common swig shaft of the filters 78, 79 is driven to turn by a step motor of the filter switch 80. The common swing shaft may be the rotary shaft of the step motor, or it may be linked with the rotary shaft of the step motor through a single gear or plural gears.

Figure 17:
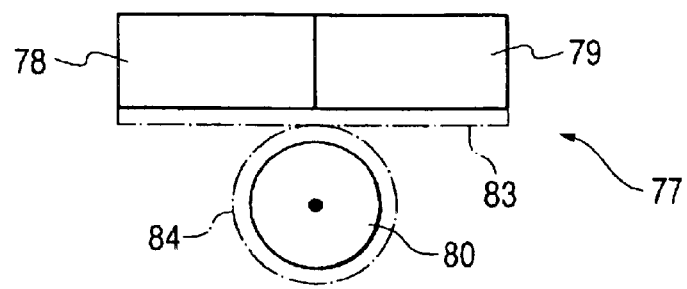
FIG. 17 is a side view to illustrate another example of a detailed construction of a filter unit of the image reading device.

FIG. 17 illustrates another example of a detailed construction of the filter unit 77. In FIG. 17, the rectangular infrared cutoff filter 78 and visible light cutoff filter 79 are disposed on one plane and coupled with each other. The filters 78, 79 have a single rack 83 attached thereto. A pinion 84 turned by the step motor of the filter switch 80 is engaged with the rack 83. The rotary shaft of the pinion 84 may be the rotary shaft of the step motor, or it may be linked with the rotary shaft of the step motor through a single gear or plural gears.

In the construction shown in FIG. 16 or FIG. 17, the step motor is turned, thereby the filters 78, 79 are made to move in the direction of vertically crossing the optical path of the lens-barrel 66, and the filters 78, 79 are inserted into the optical path. However, the image reading device according to the present invention is not limited to the one having the filter unit 77 shown in FIG. 16 or FIG. 17, and the filter unit 77 may be varied appropriately. For example, the step motor may be replaced by a solenoid.

Figure 18:
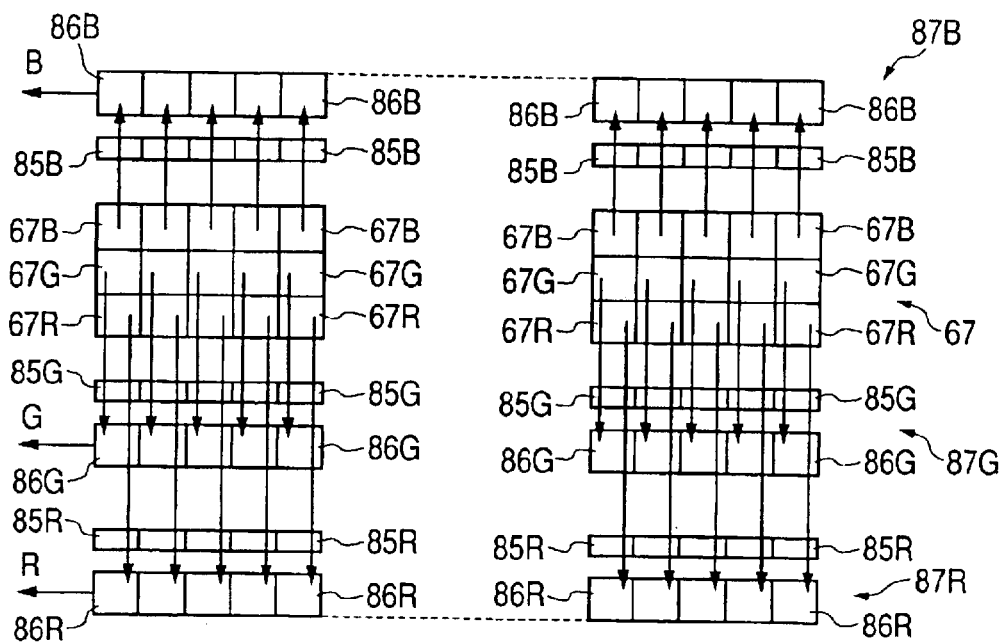
FIG. 18 is a side view to illustrate an example of a detailed construction of a line image sensor of the image reading device.

As mentioned above, the line image sensor 67 reads the image on the copy sheet 63 by receiving the reflected light from the copy sheet 63 that has passed through the lens-barrel 66, and generates read image data corresponding to the image. The line image sensor 67 is a three-line CCD image sensor, which is configured, as shown in FIG. 18, by regularly arraying three types of sensitizing pixels 67B, 67G, 67R in great numbers. The horizontal direction in FIG. 18 corresponds to the vertical direction to the paper face of the drawings in FIG. 13 and FIG. 14. All the sensitizing pixels are of the same type, which is the silicon photodiode. However, each of the sensitizing pixels is provided with anyone of four kinds of color filters, whereby the sensitizing pixel 67B reads blue (B), the sensitizing pixel 67G reads green (G), and the sensitizing pixel 67R reads red (R). In FIG. 18, the sensitizing pixels are arrayed in three rows in such a manner that one of the three types of the sensitizing pixels 67B, 67G, 67R is allocated in one and the same row. However, the mutual layout of the sensitizing pixels 67B, 67G, 67R is not limited to the three rows as illustrated so long as it is regular, if there is any regularity. For example, all the three types may be arrayed in one row.

Gates 85B, 85G, 85R and CCD registers 86B, 86G, 86R are disposed near the line sensor 67. The charges generated in the sensitizing pixel 67B pass through the corresponding gate 85B to be transferred to the corresponding CCD register 86B. Similarly, the charges generated in the sensitizing pixels 67G, 67R pass through the corresponding gate 85G, 85R to be transferred to the corresponding CCD registers 86G, 86R. The same types of the CCD registers 86B, 86G, 86R constitute a series of register channels 87B, 87G, 87R.

The line sensor 67 reads the visible images on the copy as follows. First, the reflected light from the copy sheet 63 falls on the sensitizing pixels 67B, 67G, 67R. And, after the charges for one line of the main scanning direction are integrated, the charges of the sensitizing pixels 67B, 67G, 67R pass through the corresponding gate 85B, 85G, 85R, which are transferred to the corresponding CCD registers 86B, 86G, 86R. Thereafter, a control clock pulse is given to the CCD registers 86B, 86G, 86R of the register channels 87B, 87G, 87R in a specific order. Then, the charges of the CCD registers 86B, 86G, 86R are outputted in accordance with the parallel order of the main scanning direction. That is, analog read image data pieces of B, G, R are outputted. Thus, the reading of image data in the main scanning direction is carried out. During the movement of the carriages 64, 65 (movement in the sub-scanning direction), the reading in the main scanning direction is repeated, and thereby the whole face of the copy is read.

Figure 14:
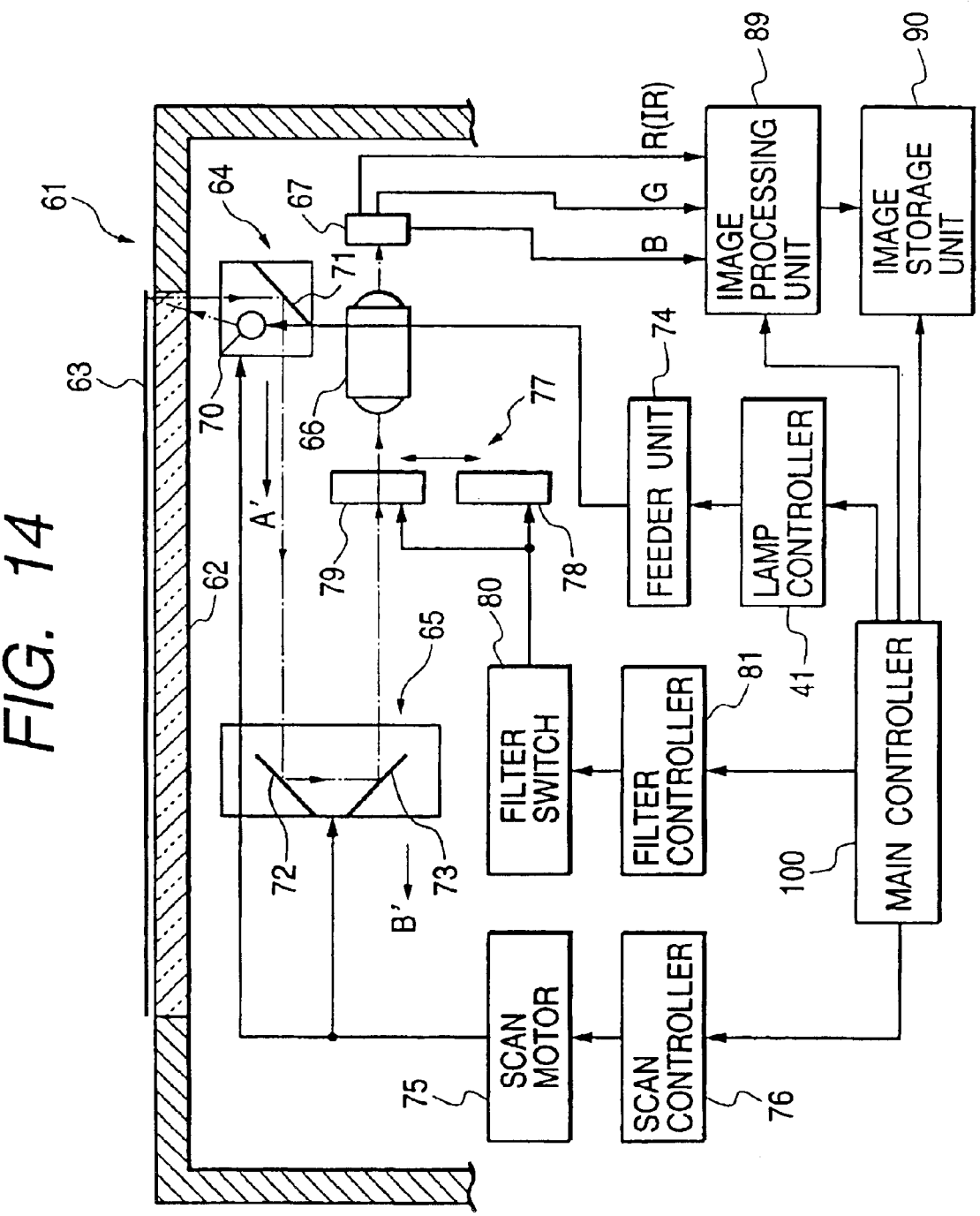
FIG. 14 illustrates a state in which the carriages of the image reading device shown in FIG. 13 are shifted.

The analog read image data pieces of B, G, R are supplied to an image processing unit 89 shown in FIG. 13 and FIG. 14. The image processing unit 89 applies various processing to each of the read image data pieces, and sends out digital read image data corresponding to these analog read image data to an image storage unit 90. The image processing unit 89 will be discussed in detail later. The image storage unit 90 relates the read image data from the image processing unit 89 to generate read image data sets of each color corresponding to a sheet of copy, and stores the read image data sets. The image processing unit 89, the image storage unit 90, the lamp controller 41, the filter controller 81, and the scan controller 76 are controlled by a main controller 100.

As mentioned above, the sensitizing pixels each are silicon photodiodes, and sense a light covering a wide wavelength band of 400 to 1000 nm. The color filters provided with the sensitizing pixels 67B, 67G. 67R each assume the characteristics shown in FIG. 19. The curves (drawn by a dotted line, a solid line, a dashed line) respectively indicated by B, G, R in the drawing illustrate the spectral transmittance rate of the filters for the sensitizing pixels 67B, 67G, 67R.

Therefore, these curves can be considered to represent the spectral sensitivities of each of the sensitizing pixels 67B, 67G, 67R. As clear from FIG. 19, owing to the material characteristics of the color filters, each of the sensitizing pixels 67B, 67G, 67R constituting the line sensor 67 can read not only the visible lights, but also the infrared lights. In other words, if a light containing a wide wavelength band from the visible light to the infrared light is irradiated, the sensitizing pixel 67B will sense the blue and the infrared, the sensitizing pixel 67G the green and the infrared, and the sensitizing pixel 67R the red and the infrared.

In the reading of normal visible images, the sensing of the infrared produces noise components that give a bad influence to the three color decomposition. Therefore, by inserting the infrared cut-off filter 78 in the optical path, the sensitizing pixels 67B, 67G, 67R can sense B, G, R, respectively, with a high accuracy (see FIG. 15).

On the other hand, in the reading of the invisible images formed with the infrared absorbing toner or ink, the sensing of the infrared by the sensitizing pixels 67B, 67G, 67R is advantageous, rather the sensing of the visible lights produces noise components. Accordingly, by inserting the visible cut-off filter 79 in the optical path, any of the sensitizing pixels 67B, 67G, 67R can sense the infrared with high accuracy. When the visible cut-off filter 79 is inserted in the optical path, the spectral sensitivities of the sensitizing pixels 67B, 67G, 67R are virtually the same. Therefore, any of the sensitizing pixels 67B, 67G, 67R can sense the infrared.

Figure 19:
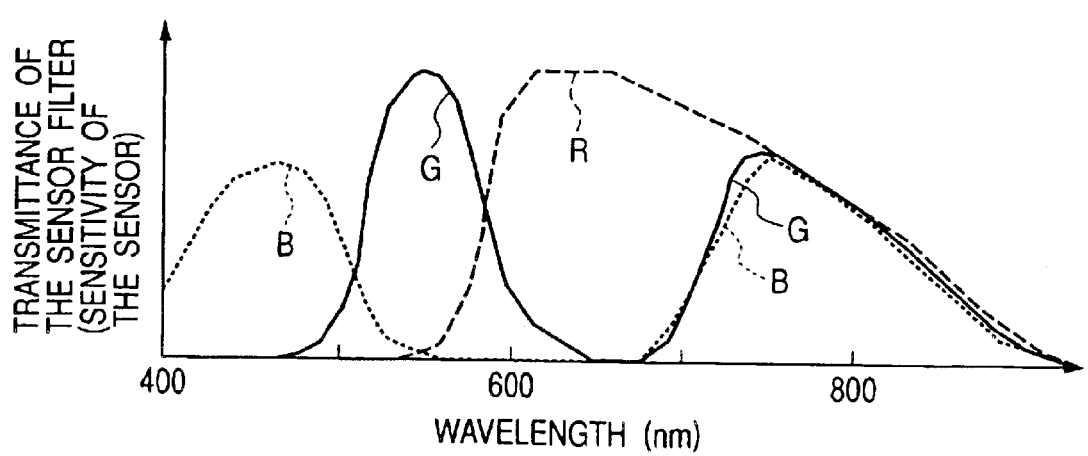
FIG. 19 illustrates a spectral transmittance of the filters used in the sensitizing pixels of the line image sensor.

However, as clear from FIG. 19, the sensitivity of the sensitizing pixel 67R is maintained in a significant level over a wide range from the red region till the infrared region. Accordingly, if the visible light cut-off filter 79 is inserted in the optical path, the read data of R is recommended to be used as the infrared read data. In this case, in the reading of the invisible images on the copy sheet 63, the line image sensor 67 is controlled so as to output only the read data of the sensitizing pixel 67R to the image processing unit 89 by the main controller 100.

Figure 20:
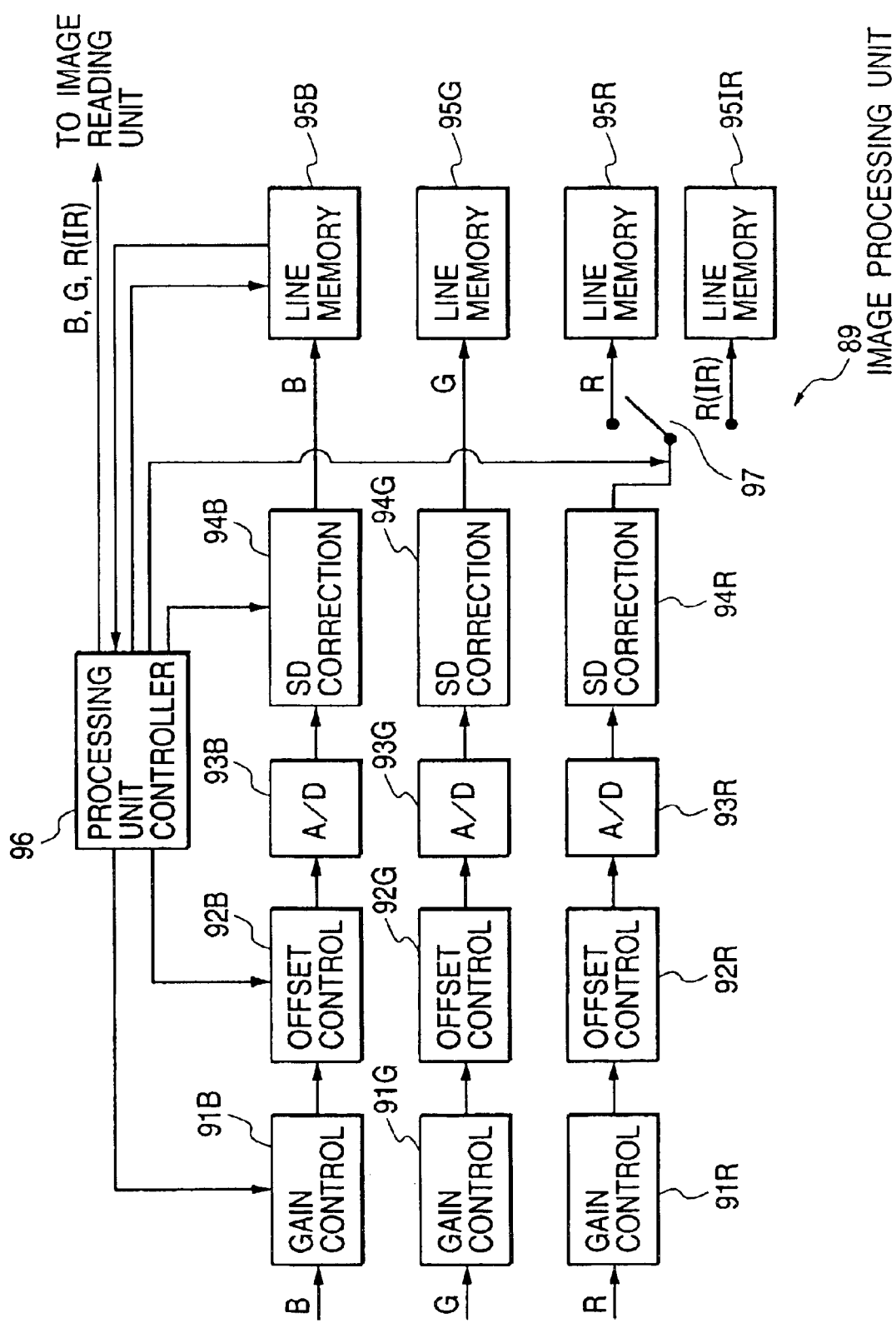
FIG. 20 is a block diagram to illustrate the detail of an image processing unit of the image reading device.

Next, referring to FIG. 20, the image processing unit 89 will be described in detail. The image processing unit 89 contains a gain control module 91, an offset control module 92, an A/D converter 93, a shading correction module 94, a line memory 95, a processing unit controller 96, and a switch 97. The suffixes B, G. R in FIG. 20 correspond to the data pieces of B. G, R; and IR corresponds to the infrared data. Each of the gain module 91 (91B, 91G, 91R) adjusts the gain of the read image data supplied from the corresponding register channel 87 (87B, 87G, 87R), and each of the offset module 92 adjusts the offset of the read image data whose gain is adjusted. Thereafter, the A/D converter 93 converts the read image data into digital read image data, and the shading correction module 94 executes the shading correction of the digital read image data by a well-known method and outputs it.

The read image data pieces of G, B outputted from the shading correction modules 94B, 94G are supplied to the line memories 95B, 95G dedicated for B, G. On the other hand, the read image data of R outputted from the shading correction module 94R is supplied to either the line memory 95R or 95IR by the switch 97. Each line memory (95B to 95IR) stores the corresponding read image data for one line.

The processing unit controller 96 reads the read image data for one line from each line memory (95B to 95IR) to be transferred to the image storage unit 90.

The processing unit controller 96 executes, in accordance with the reading mode, the variation of the gain of each gain control module 91, the variation of the offset of each offset control module 92, and the variation of the white reference data for shading correction of each shading correction module 94. These variations are made, because it is necessary to regulate the read image data in the reading using the visible lights (first reading mode) and the reading using the infrared (second reading mode). However, since the read image data pieces of B, G are not used in the second mode of this embodiment, the processing unit controller 96 executes, in accordance with the reading mode, the variation of the gain of only the gain control module 91R, the variation of the offset of only the offset control module 92R, and the variation of the white reference data for shading correction of only the shading correction module 94R.

Further, the processing unit controller 96 operates the switch 97 according to the reading mode. Concretely, in the first reading mode, the switch 97 is operated such that the read image data of R outputted from the shading correction module 94R is supplied to the line memory 95R, to connect the shading correction module 94R with the line memory 95R. In the second reading mode, the switch 97 is operated such that the read image data of R outputted from the shading correction module 94R is supplied to the line memory 95IR, to connect the shading correction module 94R with the line memory 95IR (the read image data of R in this case is the read image data of the infrared (IR)).

Figure 21:
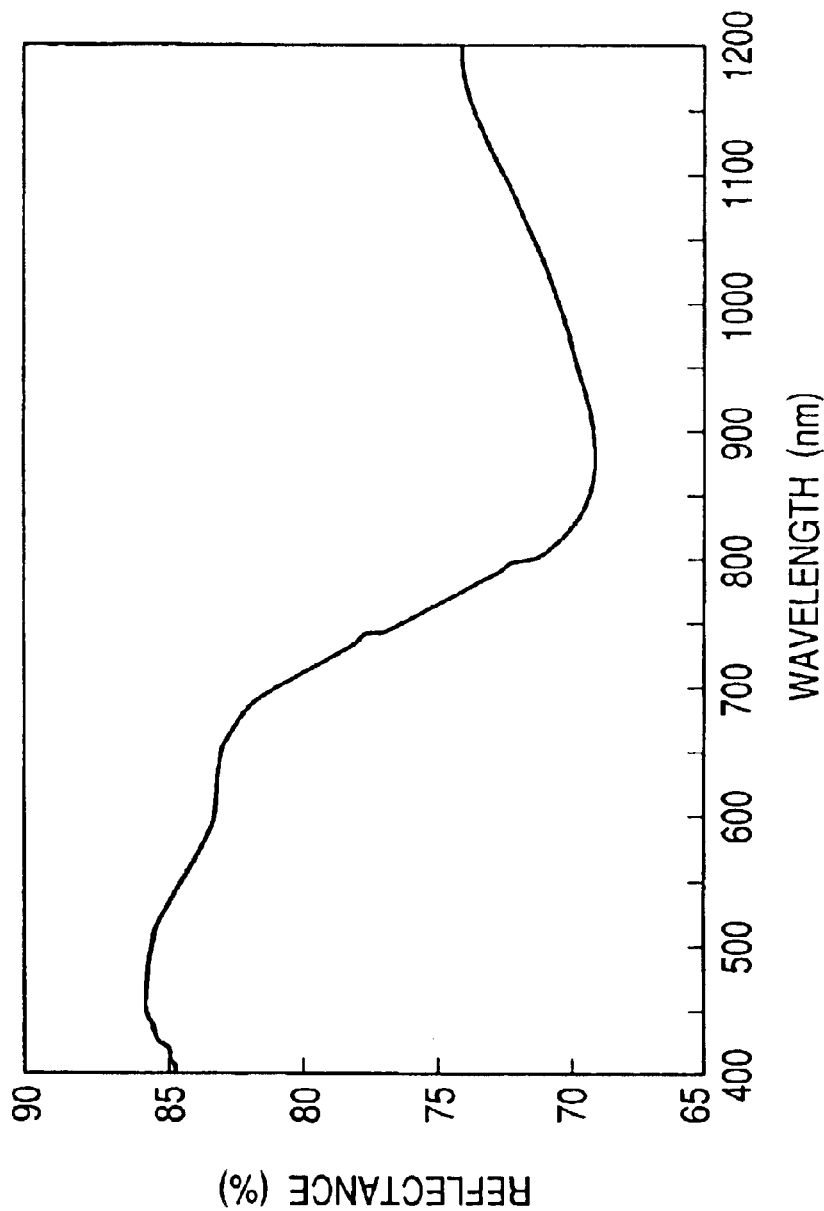
FIG. 21 is a graph to illustrate a spectral reflectance distribution of infrared absorbing toner.

FIG. 21 illustrates a spectral reflectance distribution of infrared absorbing toner. The infrared absorbing toner contains an infrared absorbent, which is a special toner that does not substantially absorb a light covering the visible light region, and significantly absorbs a light covering the infrared region. The infrared absorbing toner shown in FIG. 21 significantly absorbs a light whose wavelength is more than 700 nm, especially 800 to 1000 nm, and the wavelength at the peak absorption is about 900 nm. Therefore, human eyes cannot substantially recognize the image formed by this infrared absorbing toner. In order to read the image formed by such infrared absorbing toner with high accuracy, it is desirable to employ a reading sensing system that irradiates a light in a region covering the wavelength 800 to 1000 nm and senses the light in this wavelength range.

The fluorescent lamp 20 or 50 used as the lamp 70 possesses emission peaks in the range from 800 to 1000 nm in the second emission mode, as shown in FIG. 8 or FIG. 12. And, the sensitizing pixels 67B, 67G, 67R (specially, sensitizing pixel 67R) sense a light over this wavelength range, since the visible light cutoff filter 79 cuts the visible lights. Therefore, the aforementioned image reading device is able to read the images formed with the infrared absorbing toner shown in FIG. 21, or toner or ink having the absorbing spectral characteristic similar to this.

As an irradiation light source for the image reading device, the halogen lamp has been wide spread, and the halogen lamp is able to irradiate visible lights and infrared lights. Accordingly, if the filter unit 77 capable of the filter exchange is applied to the halogen lamp, it will be possible to switch the read wavelength range. However, since the major part of the output energy of the halogen lamp is the infrared, the halogen lamp is not excellent in the luminous efficiency for obtaining the visible lights, and the power consumption is high.

In contrast to this, this image reading device is able to use the rare gas fluorescent lamp 20 or 50 that consumes less power, and emits a light of stabilized luminous energy. Moreover, the emission mode of the fluorescent lamp 20 or 50 can be switched by the simple method as mentioned above.

Figure 22:
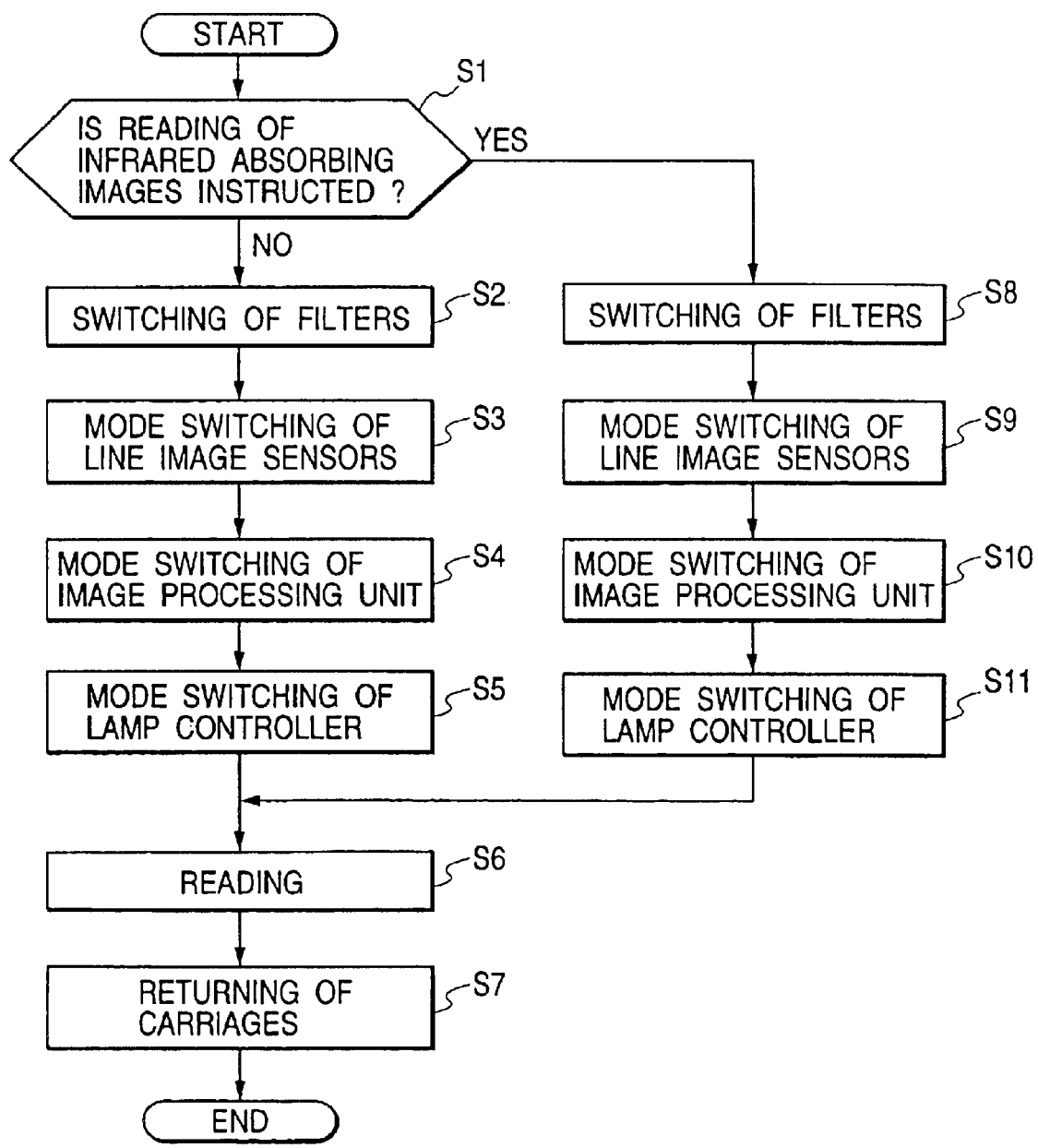
FIG. 22 is a flowchart to illustrate an example of an image reading method using the image reading device.

Referring to a flowchart shown in FIG. 22, an image reading method using the foregoing image reading device will be explained. FIG. 22 is a flowchart to illustrate this image reading method. First, at step S1, the main controller 100 judges whether or not the reading of an infrared absorbing image is instructed to a user interface not illustrated. If the judgment is 'NO', namely, if it is the reading of the visible images thereafter, the process advances to step S2. At step S2, the main controller 100 supplies the filter controller 81 with a filter switching signal as needed, and brings the infrared cutoff filter 78 of the filter unit 77 into the optical path. However, if the reading of the infrared absorbing image is not already executed immediately before, since the infrared cutoff filter 78 intervenes in the optical path, this step will not be executed.

At step S3, the main controller 100 supplies the line image sensor 67 with a first reading mode selection signal, and makes it possible to output the read data of all the sensitizing pixels 67B, 67G, 67R to the image processing unit 89. Next, at step S4, the main controller 100 supplies the first reading mode selection signal to the processing unit controller 96 of the image processing unit 89. In accordance with this, the processing unit controller 96 executes, so as to conform.with the reading of the visible image, the variation of the gain of the gain control module 91R, the variation of the offset of the offset control module 92R, and the variation of the white reference data for shading correction of the shading correction module 94R. Further, the processing unit controller 96 operates the switch 97 to connect the shading correction module 94R with the line memory 95R.

And, at step S5, the main controller 100 supplies the lamp controller 41 with the first reading mode selection signal. If the lamp 70 is the fluorescent lamp 20 having two pairs of the electrodes, thereafter, the lamp controller 41 will be able to supply the lighting instruction signal only to the inverter circuit $31_o$, of the feeder circuit $30_o$ for the external electrode discharge. If the lamp 70 is the fluorescent lamp 50 having a pair of the electrodes, thereafter, the lamp controller 41 will switch the switch 54 of the impedance variable circuit 52 off so as to give a smaller current to the internal electrodes 23a, 23b, as compared to that in the second mode. In any case, if the lamp 70 is fed, thereafter, it emits in the first emission mode.

However, in the setting of the normal default value, the filter unit 77, line image sensor 67, processing unit controller 96, and lamp controller 41 are brought into conformity with the reading of the visible image. Therefore, if the reading of the infrared absorbing image is not already executed immediately before, the step S2 as well as the step S3 through step S5 will not be executed.

Thereafter, at step S6, the reading of the image is executed. Namely, the lamp 70 is brought into emission, and the carriages 64, 65 are shifted from the initial position shown in FIG. 13 to the end position shown in FIG. 14. Then, at step S7, the lamp 70 is put off, and the carriages 64, 65 are returned to the initial position shown in FIG. 13 from the end position shown in FIG. 14, finishing the processing. Between step S6 and step S7, the read image data pieces of B. G, R are sent from the line image sensor 67 to the image processing unit 89, and the read image data pieces of B, G, R processed by the image processing unit 89 are stored in the image storage unit 90.

On the other hand, if the judgment at step S1 is 'YES', namely, if it is the reading of the infrared absorbing image thereafter, the process advances to step S8. At step S8, the main controller 100 supplies the filter controller B1 with the filter switching signal as needed, and brings the visible light cutoff filter 79 of the filter unit 77 into the optical path. However, if the reading of the infrared absorbing image is already executed immediately before, since the visible cutoff filter 79 intervenes in the optical path, this step will not be executed.

Next at step S9, the main controller 100 supplies the line image sensor 67 with a second reading mode selection signal, and makes it possible to output the read data of only the sensitizing pixel 67R to the image processing unit 89. Next, at step S10, the main controller 100 supplies the second reading mode selection signal to the processing unit controller 96 of the image processing unit 89. In accordance with this, the processing unit controller 96 executes, so as to conform with the reading of the infrared absorbing image, the variation of the gain of the gain control module 91R, the variation of the offset of the offset control module 92R, and the variation of the white reference data for shading correction of the shading correction module 94R. Further, the processing unit controller 96 operates the switch 97 to connect the shading correction module 94R with the line memory 95IR.

And, at step S11, the main controller 100 supplies the lamp controller 41 with the second reading mode selection signal. If the lamp 70 is the fluorescent lamp 20 having two pairs of the electrodes, thereafter, the lamp controller 41 will be able to supply the lighting instruction signal only to the inverter circuit $31_i$ of the feeder circuit $30_i$ for the internal electrode discharge. If the lamp 70 is the fluorescent lamp 50 having a pair of the electrodes, thereafter, the lamp controller 41 will switch on the switch 54 of the impedance variable circuit 52 so as to give a bigger current to the internal electrodes 23a, 23b, as compared to that in the first mode. In any case, if the lamp 70 is fed, thereafter, it emits in the second emission mode.

However, if the reading of the infrared absorbing image is already executed immediately before, the step S9 through step S11 as well as the step S8 will not be executed.

Thereafter, the process advances to step S6, S7 that execute the reading of the images and the carriage return, and terminates the process. Between step S6 and step S7, the read image data of R (can be regarded as IR) is sent from the line image sensor 67 to the image processing unit 89, and the read image data of IR processed by the image processing unit 89 is stored in the image storage unit 90.

Figure 23:
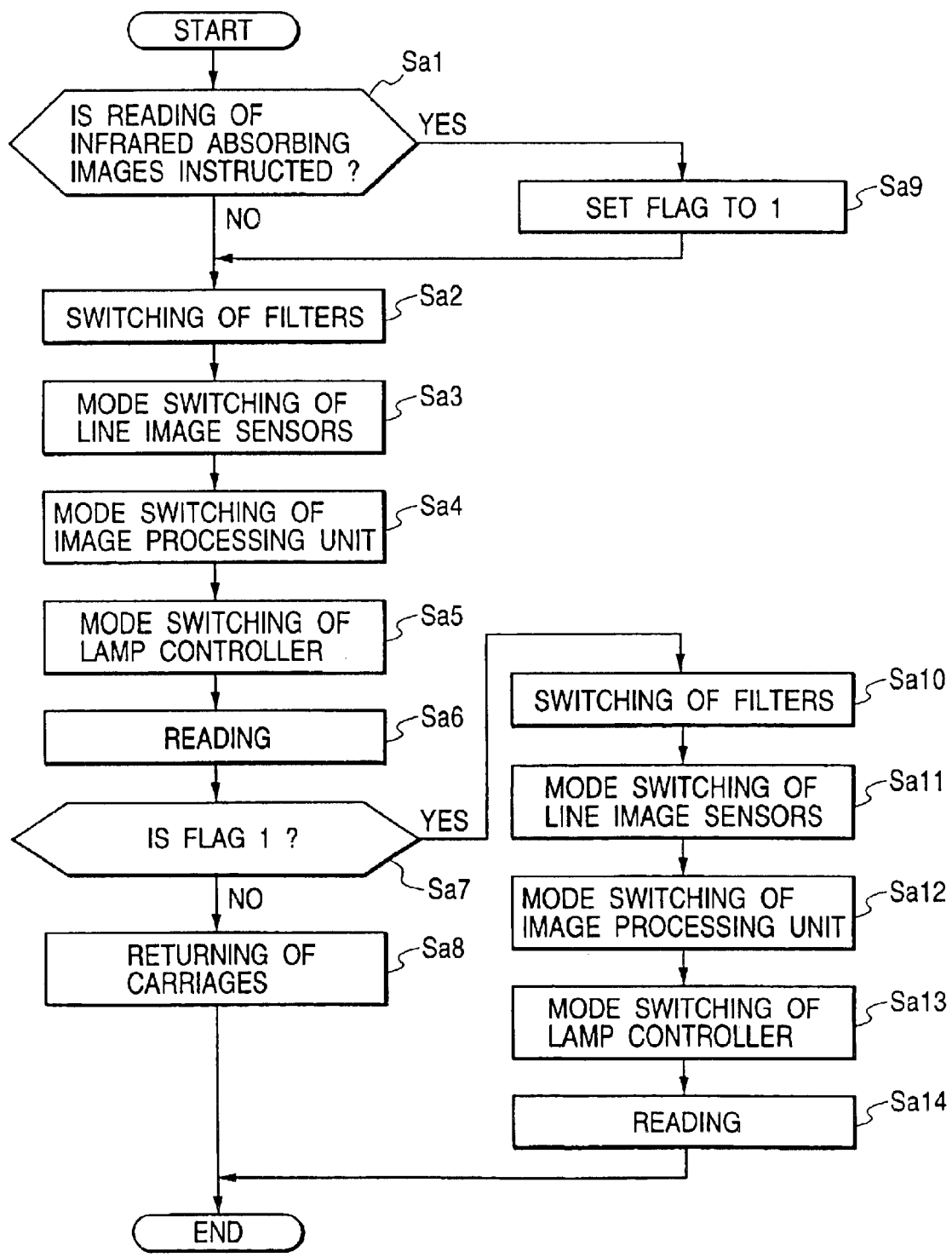
FIG. 23 is a flowchart to illustrate another example of an image reading method using the image reading device.

Referring to a flowchart shown in FIG. 23, another image reading method using the foregoing image reading device will be explained. In this example, if it is instructed to read the infrared absorbing image, the visible lights are read by utilizing the carriages 64, 65 moved from the initial position shown in FIG. 13 to the end position shown in FIG. 14, and then the infrared lights are read by utilizing the carriages 64, 65 moved to the initial position from the end position.

First, at step Sa1, the main controller 100 judges whether or not the reading of an infrared absorbing image is instructed to a user interface not illustrated. If the judgment is 'NO', namely, if it is the reading of only the visible images thereafter, the process directly advances to step Sa2. On the other hand, if the judgment is 'YES', namely, if the reading of the infrared absorbing images is instructed, the process advances to step Sa9 that sets the flag to 1, and then advances to step Sa2.

At step Sa2, the main controller 100 supplies the filter controller 81 with the filter switching signal as needed, and brings the infrared cutoff filter 78 of the filter unit 77 into the optical path. However, if the reading of the infrared absorbing image is not already executed immediately before, since the infrared cutoff filter 78 intervenes in the optical path, this step will not be executed.

At step Sa3, the main controller 100 supplies the line image sensor 67 with the first reading mode selection signal, and makes it possible to output the read data of all the sensitizing pixels 67B. 67G, 67R to the image processing unit 89. Next, at step Sa4, the main controller 100 supplies the first reading mode selection signal to the processing unit controller 96 of the image processing unit 89. In accordance with this, the processing unit controller 96 executes, so as to conform with the reading of the visible image, the variation of the gain of the gain control module 91R, the variation of the offset of the offset control module 92R, and the variation of the white reference data for shading correction of the shading correction module 94R. Further, the processing unit controller 96 operates the switch 97 to connect the shading correction module 94R and the line memory 95R.

And, at step Sa5, the main controller 100 supplies the lamp controller 41 with the first reading mode selection signal. If the lamp 70 is the fluorescent lamp 20 having two pairs of the electrodes, thereafter, the lamp controller 41 will be able to supply the lighting instruction signal only to the inverter circuit $31_o$ of the feeder circuit $30_o$, for the external electrode discharge. If the lamp 70 is the fluorescent lamp 50 having a pair of the electrodes, thereafter, the lamp controller 41 will switch the switch 54 of the impedance variable circuit 52 off so as to give a smaller current to the internal electrodes 23a, 23b. In any case, if the lamp 70 is fed, thereafter, it emits in the first emission mode.

However, in the setting of the normal default value, the filter unit 77, line image sensor 67, processing unit controller 96, and lamp controller 41 are brought into conformity with the reading of the visible image. Therefore, if the reading of the infrared absorbing image is not already executed immediately before, the step Sa2 as well as the step Sa3 through step Sa5 will not be executed.

Thereafter, at step Sa6, the reading of the visible image is executed. Namely, the lamp 70 is brought into emission, and the carriages 64, 65 are moved from the initial position shown in FIG. 13 to the end position shown in FIG. 14. And, by utilizing this movement, the read image data pieces of B, G, R are sent from the line image sensor 67 that senses the images to the image processing unit 89, and the read image data pieces of B, G, R processed by the image processing unit 89 are stored in the image storage unit 90.

Next, after the lamp 70 is put off, whether the flag is 1 or not is judged at step Sa7. If the judgment is 'NO', namely, if the reading of the infrared absorbing image is not instructed, the process advances to step Sa8. At step Sa8, the carriages 64, 65 are returned from the end position to the initial position, thus terminating the processing.

In reverse, if the judgment at step Sa7 is 'YES', namely, if the reading of the infrared absorbing image is instructed, the process advances to step Sa10. At step Sa10, the main controller 100 supplies the filter controller 81 with the filter switching signal, and brings the visible light cutoff filter 79 of the filter unit 77 into the optical path.

Next at step Sa11, the main controller 100 supplies the line image sensor 67 with the second reading mode selection signal, and makes it possible to output the read data of only the sensitizing pixel 67R to the image processing unit 89. Next, at step Sa12, the main controller 100 supplies the second reading mode selection signal to the processing unit controller 96 of the image processing unit 89. In accordance with this, the processing unit controller 96 executes, so as to conform with the reading of the infrared absorbing image, the variation of the gain of the gain control module 91R, the variation of the offset of the offset control module 92R, and the variation of the white reference data for shading correction of the shading correction module 94R. Further, the processing unit controller 96 operates the switch 97 to connect the shading correction module 94R with the line memory 95IR.

And, at step Sa13, the main controller 100 supplies the lamp controller 41 with the second reading mode selection signal. If the lamp 70 is the fluorescent lamp 20 having two pairs of the electrodes, thereafter, the lamp controller 41 will be able to supply the lighting instruction signal only to the inverter circuit 31$_i$ of the feeder circuit 30$_i$ for the internal electrode discharge. If the lamp 70 is the fluorescent lamp 50 having a pair of the electrodes, thereafter, the lamp controller 41 will switch the switch 54 of the impedance variable circuit 52 on so as to give a bigger current to the internal electrodes 23a, 23b. In any case, if the lamp 70 is fed, thereafter, it emits in the second emission mode.

Thereafter, the process advances to step Sa14 that executes the reading of the infrared absorbing images. That is, the lamp 70 is brought into emission, and the carriages 64, 65 are moved from the end position shown in FIG. 14 to the initial position shown in FIG. 13. By utilizing this movement, the read image data of R (can be regarded as IR) is sent from the line image sensor 67 that senses the images to the image processing unit 89, and the read image data of IR processed by the image processing unit 89 is stored in the image storage unit 90. In the method shown in FIG. 23, continuous reading of the visible images and the infrared absorbing images is possible in one reciprocating movement of the carriages, and the time to read both can be shortened.

Fourth Embodiment
Another Example of the Image Reading Device

Figure 24:
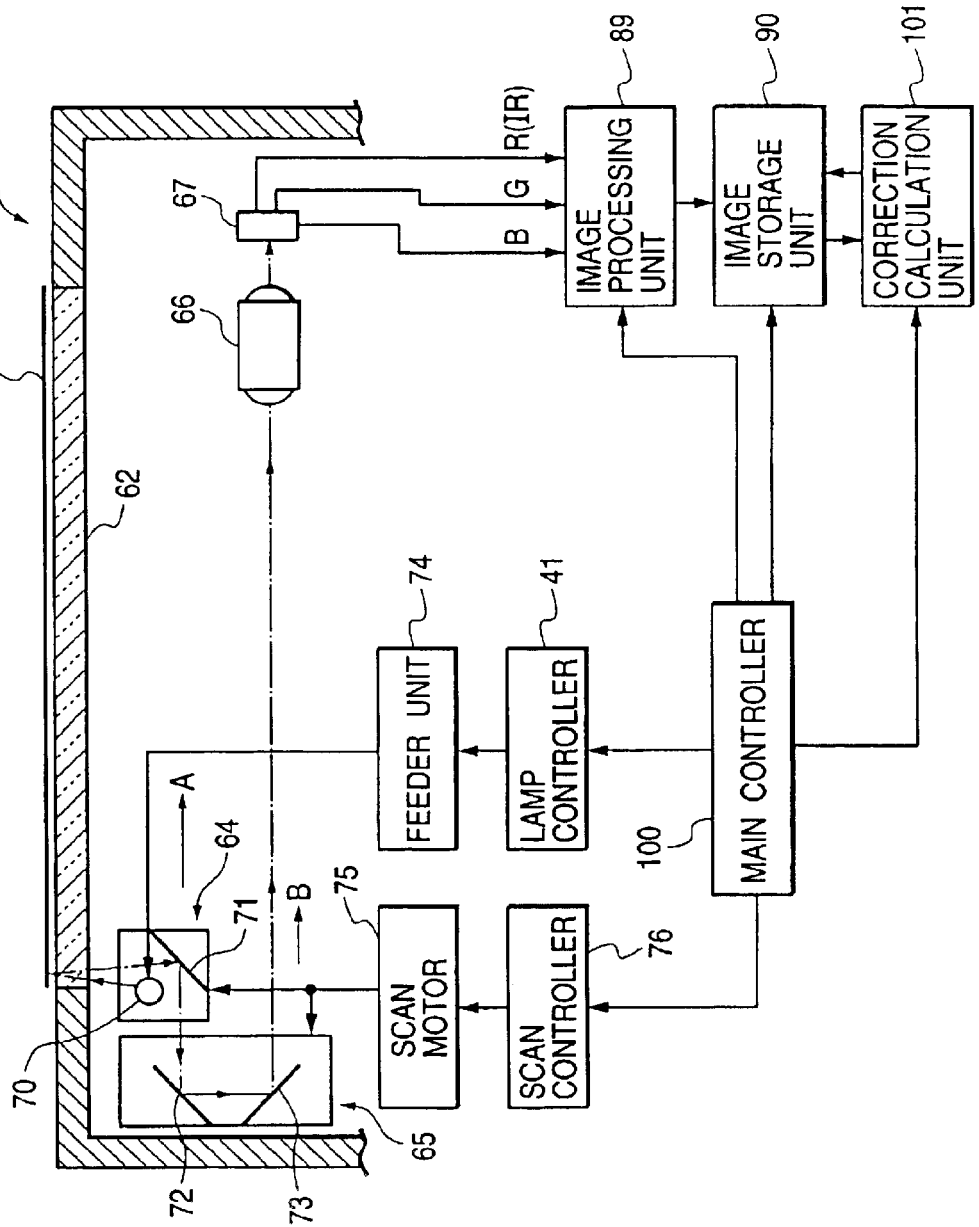
FIG. 24 is a schematic block diagram to illustrate another example of an image reading device.

FIG. 24 illustrates another example of the image reading device. In FIG. 24, the components common to those in FIG. 13 and FIG. 14 are given the same numbers to simplify the explanation. Since the device shown in FIG. 24 is not provided with the filter unit 77 and the components required for it, and accordingly, the infrared cutoff filter 78 and the visible cutoff filter 79 either, the unnecessary components of light are not removed. Therefore, the read image data pieces B, G, R, IR generated by the image processing unit of this device possess errors as shown by the following equation, against the read image data pieces B$_e$, G$_e$, R$_e$, IR$_e$ in which the unnecessary components of light are removed.

$B=B_e+\Delta B_{IR}$ $G=G_e+\Delta G_{IR}$ $R=R_e+\Delta R_{IR}$ $IR=IR_e+\Delta IR_V$ Here, $\Delta B_{IR}$, $\Delta G_{IR}$, $\Delta R_{IR}$ are the errors due to the infrared lights having been sensed, and $\Delta IR_V$ is the error due to the visible lights having been sensed.

The device shown in FIG. 24 is provided with a correction calculation unit 101 that reads the read image data pieces B, G, R, IR temporarily stored in the image storage unit 90 to apply the correction calculation thereto, and stores the read image data pieces B', G', R', IR' having the correction calculation applied, finally in the image storage unit 90. The main controller 100 starts the operation of the correction calculation unit 101 when the read image data pieces B, G, R, IR are transferred to the image storage unit 90. The detail of the correction calculation expression (correction calculation format) will be shown by the expression 1.

(Expression 1)

$$\begin{bmatrix} R' \\ G' \\ B' \\ IR' \end{bmatrix} = \begin{bmatrix} a_{11} & a_{12} & a_{13} & a_{14} \\ a_{21} & a_{22} & a_{23} & a_{24} \\ a_{31} & a_{32} & a_{33} & a_{34} \\ a_{41} & a_{42} & a_{43} & a_{44} \end{bmatrix} \times \begin{bmatrix} R \\ G \\ B \\ IR \end{bmatrix}$$

Here, the correction parameters a11 through a44 are calculated so as to be optimized by the experiment, and they are stored in the internal memory of the correction calculation unit 101.

Thus, based on the read results B, G. R in the reading mode of the visible images and the read result IR in the reading mode of the invisible images, the read results B', G', R' relating to the visible images and the read result IR' relating to the invisible images are generated. The read image data pieces B', G', R', IR' thus acquired are inferior in accuracy to the read image data pieces B$_e$, G$_e$, R$_e$, IR$_e$ in which the unnecessary components of light are removed, but the former are approximate to the latter. And, since this embodiment can omit the filter unit 77, etc., the production cost can be reduced.

Figure 25:
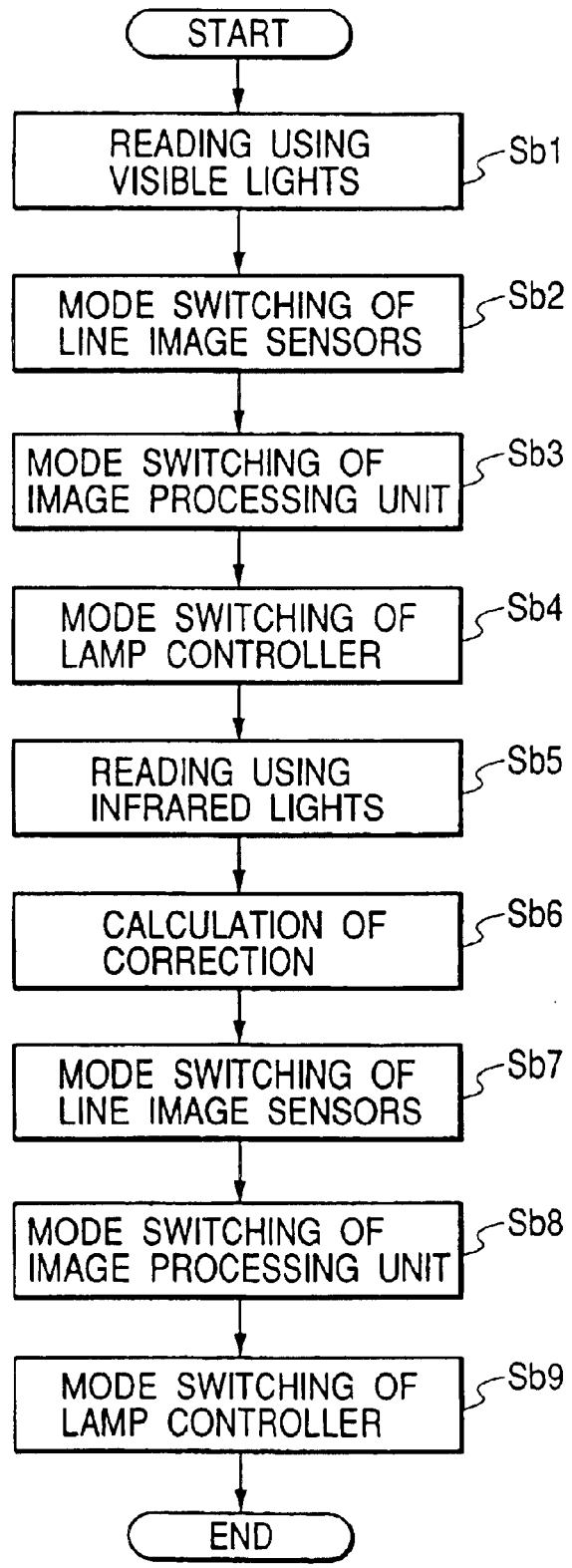
FIG. 25 is a flowchart to illustrate an example of an image reading method using the image reading device shown in FIG. 24.

This device inevitably requires two-time reading (reading using the visible lights and reading using the infrared lights) for one copy sheet 63, whether the image to be read is the visible image or the infrared absorbing image. As shown in FIG. 25, in one reciprocating movement of the carriages, if the reading using the visible lights and the reading using the infrared lights are continuously executed, it will be possible to shorten the time to read both. In the method shown in FIG. 25, first the reading of the visible image is executed at step Sb1. That is, the lamp 70 is brought into emission, and the carriages 64, 65 are moved from the same initial position as shown in FIG. 13 to the same end position as shown in FIG. 14. And, by utilizing this movement, the read image data pieces of B, G, R are sent from the line image sensor 67 that senses the images to the image processing unit 89, and the read image data pieces of B, G, R processed by the image processing unit 89 are temporarily stored in the image storage unit 90.

Next, at step Sb2, the main controller 100 supplies the line image sensor 67 with the second reading mode selection signal, and makes it possible to output the read data of only the sensitizing pixel 67R to the image processing unit 89. Next, at step sb3, the main controller 100 supplies the second reading mode selection signal to the processing unit controller 96 of the image processing unit 89. In accordance with this, the processing unit controller 96 executes, so as to conform with the reading of the infrared absorbing image, the variation of the gain of the gain control module 91R, the variation of the offset of the offset control module 92R, and the variation of the white reference data for shading correction of the shading correction module 94R. Further, the processing unit controller 96 operates the switch 97 to connect the shading correction module 94R and the line memory 95IR.

And, at step Sb4, the main controller 100 supplies the lamp controller 41 with the second reading mode selection signal. If the lamp 70 is fed, thereafter, it emits in the second emission mode. Thereafter, the process advances to step Sb5, where the reading of the infrared absorbing images is executed. That is, the lamp 70 is brought into emission, and the carriages 64, 65 are moved from the same end position as shown in FIG. 14 to the same initial position as shown in FIG. 13. And, by utilizing this movement, the read image data of R (can be regarded as IR) is sent from the line image sensor 67 that senses the images to the image processing unit 89, and the read image data of IR processed by the image processing unit 89 is temporarily stored in the image storage unit 90.

Thereafter, the main controller 100 starts the correction calculation unit 101. The correction calculation unit 101 executes the correction calculation based on the read image data pieces B, G, R. IR acquired by the two-time reading, and makes the image storage unit 90 store the read image data pieces B', G', R', IR' produced as the results.

Next, for the reading of a new copy, at step Sb7, the main controller 100 supplies the line image sensor 67 with the first reading mode selection signal, and makes it possible to output the read data of all the sensitizing pixels 67B, 67G, 67R to the image processing unit 89. Next, at step Sb8, the main controller 100 supplies the first reading mode selection signal to the processing unit controller 96 of the image processing unit 89. In accordance with this, the processing unit controller 96 executes, so as to conform with the reading of the visible image, the variation of the gain of the gain control module 91R, the variation of the offset of the offset control module 92R, and the variation of the white reference data for shading correction of the shading correction module 94R. Further, the processing unit controller 96 operates the switch 97 to connect the shading correction module 94R and the line memory 95R. And, at step Sb9, the lamp controller 41 is supplied with the first reading mode selection signal. And, if the lamp 70 is fed, it emits in the first emission mode. Thus, the line image sensor 67, processing unit controller 96, and lamp controller 41 are brought into conformity with the reading of the visible image, and the processing is finished.

Fifth Embodiment
Another Example of the Image Reading Device

As mentioned above, it is conceivable that this fluorescent lamp 20 having two pairs of the electrodes shown in FIG. 1 can emit the infrared lights and the visible lights with an equal intensity, by putting the inverter circuits $31_i$, $31_o$ into ON at the same time and executing the discharge between the internal electrodes and the discharge between the external electrodes at the same time. Therefore, the fluorescent lamp 20 that emits the infrared lights and the visible lights with an equal intensity can be employed as the lamp 70 for the image reading device shown in FIG. 13 and FIG. 14, or the image reading device shown in FIG. 24.

In this case, the reading method of the image reading device shown in FIG. 13 and FIG. 14 is the same as any of the foregoing methods that are described with reference to FIG. 22 and FIG. 23. However, the mode switching of the lamp controller (steps S5, S11, Sa5, Sa11) is not executed.

The reading method of the image reading device shown in FIG. 24 is the same as the foregoing method described with reference to the flowchart shown in FIG. 25. However, the mode switching of the lamp controller (steps Sb4, Sb9) is not executed. In both cases, the lamp controller 41 is used only for feeding both of the paired electrodes at the same time and stopping the feeding.

As described above, the present invention makes it possible to read the images by using the visible lights and the invisible lights that are generated by a single light source.

What is claimed is:

1. An image reading device that irradiates an object with a light and reads a reflected light, comprising:
   a single light source capable of irradiating a visible light and an invisible light;
   a reading unit that reads the reflected light from the object irradiated with the light from the light source; and
   a controller that selectively switches an emission mode of the light source, wherein the emission mode includes a first mode for reading that uses the visible light and a second mode for reading that uses the invisible light, wherein the light source is a fluorescent lamp, and the emission mode is switched by changing an internal discharge state of the fluorescent lamp.

2. The image reading device according to claim 1, wherein a xenon gas is sealed up in the fluorescent lamp.

3. An image reading device that irradiates an object with a light and reads a reflected light, comprising:
   a single light source capable of irradiating a visible light and an invisible light;
   a reading unit that reads the reflected light from the object irradiated with the light from the light source; and
   a controller that selectively switches an emission mode of the light source, wherein the emission mode includes a first mode for reading that uses the visible light and a second mode for reading that uses the invisible light, wherein the light source is a fluorescent lamp, and the fluorescent lamp comprises a sealed container inside which a phosphor brought into emission by a discharge is disposed, a pair of internal electrodes disposed inside the sealed container, and a pair of external electrodes disposed outside thereof, wherein the first mode generates a discharge between the external electrodes, and the second mode generates a discharge between the internal electrodes.

4. An image reading device that irradiates an object with a light and reads a reflected light, comprising:
   a single light source capable of irradiating a visible light and an invisible light;
   a reading unit that reads the reflected light from the object irradiated with the light from the light source; and
   a controller that selectively switches an emission mode of the light source, wherein the emission mode includes a first mode for reading that uses the visible light and a second mode for reading that uses the invisible light, wherein the emission mode is switched by adjusting a current applied to the light source.

5. The image reading device according to claim 4, further comprising:
   an infrared cutoff filter;
   a visible light cutoff filter; and
   a filter switching part that selectively locates either the infrared cutoff filter or the visible light cutoff filter between the object and the reading unit, wherein the filter switching part locates the infrared cutoff filter between the object and the reading unit in the first mode, and locates the visible light cutoff filter between the object and the reading unit in the second mode.

6. An image reading device that irradiates an object with a light and reads a reflected light, comprising:
   a single light source capable of irradiating a visible light and an invisible light;
   a reading unit that reads the reflected light from the object irradiated with the light from the light source;
   a controller that selectively switches an emission mode of the light source, wherein the emission mode includes a first mode for reading that uses the visible light and a second mode for reading that uses the invisible light, wherein the invisible light is an infrared light, and the light source emits at least a light including the infrared light in the second mode; and
   a processing unit that processes a read result of the reading unit, wherein the reading unit outputs a first read result in the first mode, and outputs a second read result in the second mode, and the processing unit calculates the first read result and the second read result in accordance with a predetermined calculation format, and thereby generates a first corrected read result relating to the visible light and a second corrected read result relating to the invisible light.

7. The image reading device according to claim 6, wherein the infrared light has at least one emission peak, and the emission peak is within 800 nm to 1000 nm.

8. An image reading device that irradiates an object with a light and reads a reflected light, comprising:

a single light source capable of irradiating a visible light and an invisible light;

a reading unit that reads the reflected light from the object irradiated with the light from the light source;

a controller that selectively switches an emission mode of the light source, wherein the emission mode includes a first mode for reading that uses the visible light and a second mode for reading that uses the invisible light, wherein the invisible light is an infrared light, and the light source emits at least a light including the infrared light in the second mode; and a carriage that carries the reading unit in a first direction and a second direction in reverse to each other, wherein the light source emits in the first mode when the reading unit moves in the first direction, and the light source emits in the second mode when the reading unit moves in the second direction.

9. The image reading device according to claim 8, wherein the infrared light has a least one emission peak, and the emission peak is within 800 to 1000 nm.

10. An image reading method that irradiates an object with a light and reads a reflected light, comprising the steps of:

switching an emission mode of a single light source capable of irradiating a visible light and an invisible light in accordance with a reading mode selected from a visible image reading mode and an invisible image reading mode by adjusting a current applied to the light source, and reading the reflected light from the object irradiated with the light from the light source while bringing the light source into emission in accordance with the emission mode switched, wherein the invisible light is an infrared light, and the light source emits at least a light including the infrared light in the second mode.

11. An image reading device that irradiates an object with a light and reads a reflected light, comprising:

a single light source capable of irradiating a visible light and an invisible light, being a fluorescent lamp that comprises a sealed container inside which a phosphor brought into emission by a discharge is disposed, a pair of internal electrodes disposed inside the sealed container, and a pair of external electrodes disposed outside thereof, a reading unit that reads the reflected light from the object irradiated with the light from the light source, and a feeder circuit that supplies the fluorescent lamp with power so as to generate a discharge between the external electrodes synchronously with a discharge between the internal electrodes.

12. A light source comprising a sealed container, a pair of internal electrodes disposed inside the sealed container, and a pair of external electrodes disposed outside the sealed container, wherein an infrared light is generated more in a discharge between the internal electrodes than in a discharge between the external electrodes.

13. The light source according to claim 12, wherein a discharge between the internal electrodes is different from discharge between the external electrodes in an emission mode.

14. The light source according to claim 12, wherein a discharge between the internal electrodes is different from a discharge between the external electrodes in a wavelength distribution of lights.

\* \* \* \* \*